(12) United States Patent
Matolak

(10) Patent No.: US 7,881,361 B2
(45) Date of Patent: Feb. 1, 2011

(54) SPECTRALLY SHAPED GENERALIZED MULTITONE DIRECT SEQUENCE SPREAD SPECTRUM MODULATION

(75) Inventor: David W. Matolak, Athens, OH (US)

(73) Assignee: Ohio University, Athens, OH (US)

( * ) Notice: Subject to any disclaimer, the term of this patent is extended or adjusted under 35 U.S.C. 154(b) by 937 days.

(21) Appl. No.: 11/665,697

(22) PCT Filed: Oct. 31, 2005

(86) PCT No.: PCT/US2005/039114
§ 371 (c)(1),
(2), (4) Date: Apr. 18, 2007

(87) PCT Pub. No.: WO2006/050181
PCT Pub. Date: May 11, 2006

(65) Prior Publication Data
US 2009/0135888 A1    May 28, 2009

Related U.S. Application Data

(60) Provisional application No. 60/623,353, filed on Oct. 29, 2004.

(51) Int. Cl.
*H04B 1/707* (2006.01)
(52) U.S. Cl. .................. 375/141; 375/146; 375/147
(58) Field of Classification Search ............... 375/140, 375/141, 146, 147
See application file for complete search history.

(56) References Cited

U.S. PATENT DOCUMENTS 5,467,367 A * 11/1995 Izumi et al. ............ 375/142

| 6,215,810 B1 | 4/2001 | Park |
| 6,359,868 B1 | 3/2002 | Chen et al. |
| 6,728,299 B2 | 4/2004 | Jung et al. |

(Continued)

FOREIGN PATENT DOCUMENTS

WO        03/092212        11/2003

OTHER PUBLICATIONS

PCT/US2005/039114, PCT International Search Report, mailed Jun. 27, 2006.

(Continued)

*Primary Examiner*—Temesghen Ghebretinsae
(74) *Attorney, Agent, or Firm*—Calfee, Halter & Griswold LLP

(57) ABSTRACT

A system (10) for communicating a direct sequence spread spectrum signal, a related transmitter (12), a related receiver (14), and methods associated therewith are provided in various embodiments. A data rate vector, a processing gain vector, a frequency separation vector, and a bit energy vector may be associated with transmitting and/or receiving a direct sequence spread spectrum signal. Each vector has a value associated with each of a plurality of channels associated with subcarriers in the direct sequence spread spectrum signal. A value for at least one of the data rate vector, processing gain vector, frequency separation vector, and bit energy vector for at least one channel is different from another value for the corresponding data rate vector, processing gain vector, frequency separation vector, or bit energy vector for another channel. Having one or more vectors with different values provides a spectrally-shaped generalized multitone (or multicarrier) direct sequence spread spectrum (SSG-MT-DS-SS) modulation scheme.

30 Claims, 21 Drawing Sheets

U.S. PATENT DOCUMENTS

| | | |
|---|---|---|
| 7,095,778 B2 | 8/2006 | Okubo et al. |
| 2003/0053521 A1 | 3/2003 | Huang et al. |
| 2003/0138031 A1 | 7/2003 | Okubo et al. |

OTHER PUBLICATIONS

PCT/US2005/039114, PCT Written Opinion of the International Searching Authority, mailed Jun. 27, 2006.

Yang et al., Performance of Generalized Multicarrier DS-CDMA Over Nakagami-m Fading Channels, IEEE Transactions on Communications, vol. 50, No. 6, Jun. 2002, pp. 956-966.

Vandendorpe, Multitone Spread Spectrum Multiple Access Communications System in a Multipath Rician Fading Channel, IEEE Transactions on Vehicular Technology, vol. 44, No. 2, May 1995, pp. 327-337.

Li et al., New Results on the Performance of MT-DS-SS in the Presence of Phase Noise, Proceedings of the 2004 IEEE Military Communications Conference (MILCOM 2004), Monterey, CA, vol. 2, Issue 31, pp. 674-678 (Oct. 31-Nov. 3, 2004).

Li et al., Phase Noise and Fading Effects on System Performance in MT-DS-SS, IEEE Transactions on Vehicular Technology, vol. 54, Issue 5, pp. 1759-1767 (Sep. 2005).

Matolak et al., Spectrally shaped generalized multitone direct-sequence spread spectrum, IEEE Transactions on Vehicular Technology, vol. 55, Issue 4, pp. 1224-1238 (Jul. 2006).

Matolak et al., Spectrally shaped generalized multitone direct-sequence spread spectrum, Proceedings of the IEEE 2004 MIlitary Communications (MILCOM 2004), Monterey, CA, vol. 2, Issue 31, pp. 668-673 (Oct. 31-Nov. 3, 2004).

Sen et al., Reduced-Complexity Bandwidth Efficient Multitone Direct Sequence Spread Spectrum, Proceedings of the 2004 IEEE/Sarnoff Symposium on Advances in Wired and Wireless Communication, Princeton, N.J., pp. 131-134 (Apr. 26-27, 2004).

Examination Report for European Patent Application No. GB0707600.3 dated Sep. 23, 2008.

* cited by examiner

SPECTRALLY SHAPED GENERALIZED MULTITONE DIRECT SEQUENCE SPREAD SPECTRUM MODULATION

This application claims priority to, and any benefit associated with, U.S. Provisional Pat. App. Ser. No. 60/623,353, filed Oct. 29, 2004, the contents of which are fully incorporated herein by reference.

BACKGROUND

Direct sequence spread spectrum (DS-SS) transmission may be used because of its well-known advantages such as resistance to interference, intentional jamming, interception, and robustness against fading. See, e.g., R. L. Pickholtz et al., "Theory of Spread-Spectrum Communications-A Tutorial," IEEE Transactions on Communications, Vol. COM-30, No. 5, pp. 855-884, May 1982 the contents of which are fully incorporated herein by reference. Furthermore, code division multiple access (CDMA) can also be accomplished by assigning a unique spreading code to each user. See, e.g., A. J. Viterbi, CDMA: Principles of Spread Spectrum Communication, Addison-Wesley, Reading, Mass., 1995 the contents of which are fully incorporated herein by reference.

The combination of the DS-SS technique and Orthogonal Frequency Division Multiplexing (OFDM) results in three types of multiplexing schemes: multicarrier code division multiple access (MC-CDMA), multicarrier direct sequence code division multiple access (MC-DS-CDMA), and multitone direct sequence code division multiple access (MT-DS-CDMA). The MC-CDMA approach spreads the data stream in the frequency domain, and the MC-DS-CDMA the MT-DS-CDMA approaches spread the data streams in the time domain. If the multiple subcarrier data streams are obtained via a serial-to-parallel (S:P) conversion of a high-rate input stream, the symbol duration of each subcarrier signal is longer than the symbol duration of an equivalent single-carrier (SC) system. As a result of the S:P conversion, intersymbol interference (ISI) can be reduced.

The performance of MC-DS-CDMA in a dispersive Rayleigh fading channel has been investigated and it has been shown that an MC-DS-CDMA system is robust in a multipath fading environment. The MC-DS-CDMA system retains the narrow band interference suppression features often desired of SC systems. For MT-DS-CDMA, good performance has also been obtained on a dispersive (Rician) channel.

The main differences between MC-DS-CDMA and MT-DS-CDMA are the frequency separation between adjacent subcarriers, and resulting processing gains. The subcarrier frequency separation of MC-DS-CDMA is the chip rate of the spreading code, whereas the subcarrier frequency separation of MT-DS-CDMA is the data rate of each subcarrier. Hence, MT-DS-CDMA has much more frequency overlap among subcarrier spectra than MC-DS-CDMA. It has been shown that an optimal spacing between adjacent subcarriers achieves better error probability performance for a given system bandwidth and given channel environment.

SUMMARY

In one aspect an apparatus for transmitting a direct sequence spread spectrum signal is provided. In one embodiment, the apparatus includes: a data transformation process transforming an input data signal into a plurality of digital data streams based, at least in part, on a data rate vector to form a plurality of channels, a logic circuit for each channel in communication with the data transformation process to form a plurality of analog data signals corresponding to the plurality of channels, each logic circuit spreading the digital data stream for the corresponding channel based, at least in part, on a processing gain vector defining a proportional relationship between a chip rate and the data rate vector for the corresponding channel, a combining process for each channel in communication with the logic circuit for the corresponding channel to form a plurality of modulated subcarrier data signals corresponding to the plurality of channels, each combining process combining the analog data signal for the corresponding channel with a subcarrier frequency defined, at least in part, by a frequency separation vector associated with adjacent subcarrier frequencies, and an amplifier for each channel in communication with the combining process for the corresponding channel to form a plurality of scaled subcarrier data signals corresponding to the plurality of channels, each amplifier amplifying the modulated subcarrier data signal for the corresponding channel based, at least in part, on a bit energy vector. A value for at least one of the data rate vector, processing gain vector, frequency separation vector, and bit energy vector for at least one channel is different from another value for the corresponding data rate vector, processing gain vector, frequency separation vector, or bit energy vector for another channel.

In another aspect, a method of transmitting a direct sequence spread spectrum signal is provided. In one embodiment, the method includes: a) transforming an input data signal into a plurality of digital data streams based, at least in part, on a data rate vector to form a plurality of channels, b) spreading each digital data stream based, at least in part, on a processing gain vector defining a proportional relationship between a chip rate and the corresponding data rate vector to form a plurality of analog data signals corresponding to the plurality of channels, c) combining each analog data signal with a subcarrier frequency defined, at least in part, by a frequency separation vector associated with adjacent subcarrier frequencies to form a plurality of modulated subcarrier data signals corresponding to the plurality of channels, and d) amplifying each modulated subcarrier data signal based, at least in part, on a bit energy vector to form a plurality of scaled subcarrier data signals corresponding to the plurality of channels. A value for at least one of the data rate vector, processing gain vector, frequency separation vector, and bit energy vector for at least one channel is different from another value for the corresponding data rate vector, processing gain vector, frequency separation vector, or bit energy vector for another channel.

In yet another aspect, an apparatus for receiving a direct sequence spread spectrum signal is provided. In one embodiment, the apparatus includes: an amplifier for each of a plurality of individual subcarrier data signals, the plurality of individual subcarrier data signals corresponding to a plurality of channels, each amplifier amplifying the individual subcarrier data signal for a corresponding channel based, at least in part, on a bit energy vector to form a corresponding plurality of scaled subcarrier data signals, a separating process for each channel in communication with the amplifier for the corresponding channel to form a plurality of analog data signals corresponding to the plurality of channels, each separating process separating an analog data signal from the scaled subcarrier data signal for the corresponding channel by identifying a subcarrier frequency associated with the scaled subcarrier data signal, the subcarrier frequency defined, at least in part, by a frequency separation vector associated with adjacent subcarrier frequencies, a logic circuit for each channel in communication with the separating process for the corresponding channel to form a plurality of digital data streams corresponding to the plurality of channels, each logic circuit despreading the analog data signal for the corresponding channel based, at least in part, on a processing gain vector defining a proportional relationship between a chip rate and a corresponding data rate vector, and a data transformation process in communication with the logic circuits and transforming the plurality of digital data streams into an output data signal based, at least in part, on the data rate vector. A value for at least one of the data rate vector, processing gain vector, frequency separation vector, and bit energy vector for at least one channel is different from another value for the corresponding data rate vector, processing gain vector, frequency separation vector, or bit energy vector for another channel.

In still another aspect, a method of receiving a direct sequence spread spectrum signal is provided. In one embodiment, the method includes: a) amplifying each of a plurality of individual subcarrier data signals, based, at least in part, on a bit energy vector to form a corresponding plurality of scaled subcarrier data signals, the plurality of individual subcarrier data signals corresponding to a plurality of channels, b) separating an analog data signal from each scaled subcarrier data signal to form a plurality of analog data signals by identifying a subcarrier frequency associated with the corresponding scaled subcarrier data signal, the subcarrier frequency defined, at least in part, by a frequency separation vector associated with adjacent subcarrier frequencies, the plurality of analog data signals corresponding to the plurality of channels, c) despreading each analog data signal to form a plurality of digital data streams, the despreading based, at least in part, on a processing gain vector defining a proportional relationship between a chip rate and a corresponding data rate vector, the plurality of digital data streams corresponding to the plurality of channels, and d) transforming the plurality of digital data streams into an output data signal based, at least in part, on a data rate vector. A value for at least one of the data rate vector, processing gain vector, frequency separation vector, and bit energy vector for at least one channel is different from another value for the corresponding data rate vector, processing gain vector, frequency separation vector, or bit energy vector for another channel.

In yet another aspect, a system for communicating a direct sequence spread spectrum signal is provided. In one embodiment, the system includes: a transmitter transmitting the direct sequence spread spectrum signal and a receiver receiving the direct sequence spread spectrum signal from the transmitter. In this embodiment, the transmitter includes: a first data transformation process transforming an input data signal into a first plurality of digital data streams based, at least in part, on a data rate vector to form a plurality of first channels, a first logic circuit for each first channel in communication with the first data transformation process to form a plurality of first analog data signals corresponding to the plurality of first channels, each first logic circuit spreading the first digital data stream for the corresponding first channel based, at least in part, on a processing gain vector defining a proportional relationship between a chip rate and the data rate vector for the corresponding first channel, a combining process for each first channel in communication with the first logic circuit for the corresponding first channel to form a plurality of modulated subcarrier data signals corresponding to the plurality of first channels, each combining process combining the first analog data signal for the corresponding first channel with a subcarrier frequency defined, at least in part, by a frequency separation vector associated with adjacent subcarrier frequencies, and a first amplifier for each first channel in communication with the combining process for the corresponding first channel to form a plurality of first scaled subcarrier data signals corresponding to the plurality of first channels, each first amplifier amplifying the modulated subcarrier data signal for the corresponding first channel based, at least in part, on a bit energy vector. In this embodiment, the receiver includes: a second amplifier for each of a plurality of individual subcarrier data signals, the plurality of individual subcarrier data signals corresponding to a plurality of second channels, each second amplifier amplifying the individual subcarrier data signal for a corresponding second channel based, at least in part, on the bit energy vector to form a corresponding plurality of second scaled subcarrier data signals, a separating process for each second channel in communication with the second amplifier for the corresponding second channel to form a plurality of second analog data signals corresponding to the plurality of second channels, each separating process separating a second analog data signal from the second scaled subcarrier data signal for the corresponding second channel by identifying the subcarrier frequency associated with the modulated subcarrier data signal, the subcarrier frequency defined, at least in part, by the frequency separation vector associated with adjacent subcarrier frequencies, a second logic circuit for each second channel in communication with the separating process for the corresponding second channel to form a plurality of second digital data streams corresponding to the plurality of second channels, each second logic circuit despreading the second analog data signal for the corresponding second channel based, at least in part, on the processing gain vector, and a second data transformation process in communication with the second logic circuits and transforming the plurality of second digital data streams into an output data signal based, at least in part, on the data rate vector. A value for at least one of the data rate vector, processing gain vector, frequency separation vector, and bit energy vector for at least one first channel and corresponding second channel is different from another value for the corresponding data rate vector, processing gain vector, frequency separation vector, or bit energy vector for another first channel and corresponding second channel.

In still another aspect, a method of communicating a direct sequence spread spectrum signal from a first apparatus to a second apparatus is provided. In one embodiment, the method includes: a) at the first apparatus, transforming an input data signal into a plurality of digital data streams based, at least in part, on a data rate vector to form a plurality of channels, b) at the first apparatus, spreading each digital data stream based, at least in part, on a processing gain vector defining a proportional relationship between a chip rate and the corresponding data rate vector to form a plurality of analog data signals corresponding to the plurality of channels, c) at the first apparatus, combining each analog data signal with a subcarrier frequency defined, at least in part, by a frequency separation vector associated with adjacent subcarrier frequencies to form a plurality of modulated subcarrier data signals corresponding to the plurality of channels, d) at the first apparatus, amplifying each modulated subcarrier data signal based, at least in part, on a bit energy vector to form a plurality of scaled subcarrier data signals corresponding to the plurality of channels, e) at the second apparatus, amplifying each of a plurality of individual subcarrier data signals, based, at least in part, on the bit energy vector associated with the amplifying in d) to form a corresponding plurality of scaled subcarrier data signals, the plurality of individual subcarrier data signals corresponding to a plurality of channels, f) at the second apparatus, separating an analog data signal from each scaled subcarrier data signal to form a plurality of analog data signals by identifying a subcarrier frequency associated with the corresponding scaled subcarrier data signal, the subcarrier frequency defined, at least in part, by the frequency separation vector associated with the combining in c), the plurality of analog data signals corresponding to the plurality of channels, g) at the second apparatus, despreading each analog data signal to form a plurality of digital data streams, the despreading based, at least in part, on the processing gain vector associated with the spreading in b), the plurality of digital data streams corresponding to the plurality of channels, and h) at the second apparatus, transforming the plurality of digital data streams into an output data signal based, at least in part, on the data rate vector associated with the transforming in a). A value for at least one of the data rate vector, processing gain vector, frequency separation vector, and bit energy vector for at least one channel is different from another value for the data rate vector, processing gain vector, frequency separation vector, or bit energy vector for another channel.

BRIEF DESCRIPTION OF THE DRAWINGS

The invention as well as embodiments and advantages thereof are described below in greater detail, by way of example, with reference to the following drawings.

DETAILED DESCRIPTION

Figure 1:
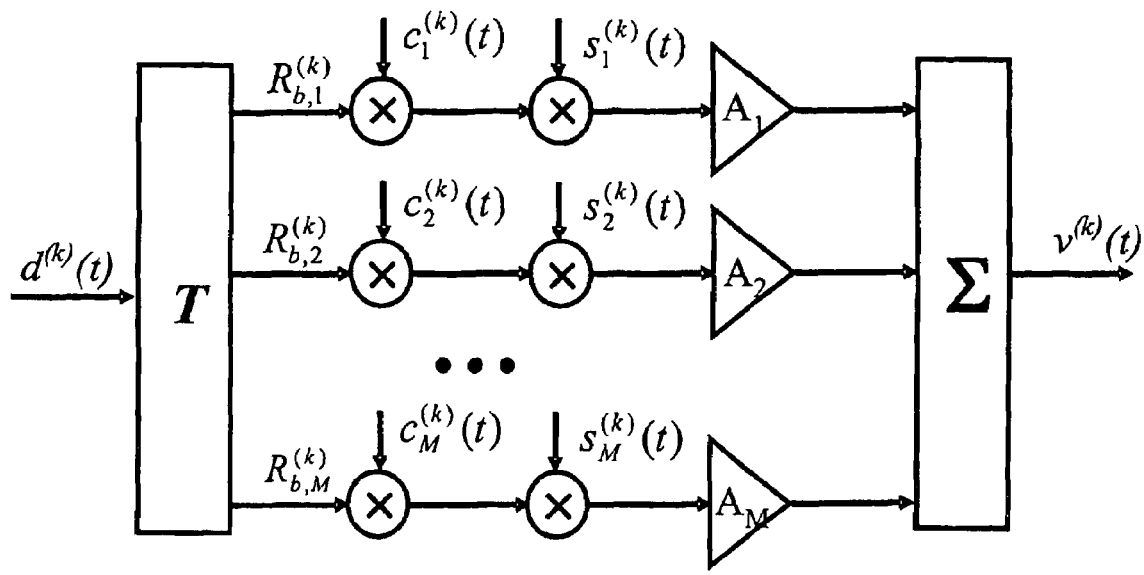
FIG. 1 is a block diagram of an exemplary embodiment of a of a transmitter adapted to generate a Spectrally-Shaped Generalized Multitone Direct Sequence Spread Spectrum (SSG-MT-DS-SS) signal.

While Spectrally-Shaped Generalized Multitone Direct Sequence Spread Spectrum (SSG-MT-DS-SS) modulation may be embodied in many different forms, there are shown in the drawings and will be described herein in detail specific embodiments thereof with the understanding that the present disclosure is to be considered as an exemplification of SSG-MT-DS-SS modulation and is not intended to limit SSG-MT-DS-SS modulation to the specific embodiments illustrated. Each of the various elements and/or steps in the drawings and/or descriptions below may be implemented in hardware, software, or a combination thereof.

The following acronyms may be used herein:

| | |
|---|---|
| $\Delta f$ | Frequency separation vector |
| AWGN | Additive white Gaussian noise |
| BER | Bit error ratio |
| BPSK | Binary phase shift-keying |
| CCDF | Complementary cumulative distribution function |
| CDMA | Code division multiple access |
| dB | Decibel |
| DS-SS | Direct sequence spread spectrum |
| $E_b$ | Bit energy vector |
| $E_b/N_0$ | Energy per bit to noise density ratio |
| FEC | Forward error correction |
| i.i.d. | Independent identically distributed |
| ISI | Inter-symbol interference |
| IS-SUI | Inter-subcarrier same user interference |
| M | Quantity of subcarriers |
| Mbps | Megabit per second |
| MC/MT-DS-SS | Multicarrier/multitone direct sequent spread spectrum |

-continued

| | |
|---|---|
| MC-CDMA | Multicarrier code division multiple access |
| MC-DS-CDMA | Multicarrier code division direct sequence multiple access |
| MC-DS-SS | Multicarrier direct sequent spread spectrum |
| MGF | Moment generation function |
| MHz | Megahertz |
| MPSK | M-way phase shift keying |
| MRC | Maximal ratio combined |
| MT-DS-CDMA | Multitone direct sequence code division multiple access |
| MT-DS-SS | Multitone direct sequent spread spectrum |
| MUI | Multiple user interference |
| N | Processing gain vector |
| OFDM | Orthogonal Frequency Division Multiplexing |
| PAPR | Peak-to-average power ratio |
| $P_b$ | Bit error probability |
| PDP | Power delay profile |
| PN | Pseudo-noise |
| PSD | Power spectrum density |
| QAM | Quadrature amplitude modulation |
| $R_b$ | Data rate vector |
| $R_c$ | Chip rate |
| RV | Random variable |
| S;P | Serial-to-parallel |
| SC | Single-carrier |
| SNIR | Signal-to-noise ratio |
| SSG-MT-DS-SS | Spectrally-Shaped Generalized Multitone Direct Sequence Spread Spectrum |
| SUI | Same user interference |

Generally, SSG-MT-DS-SS enables moderate shaping of the transmitted spectrum without the use of spectral shaping filters; instead, the spectrum is shaped by appropriate selection of the parameters of each subcarrier. These parameters are amplitude, data rate, processing gain, and the frequency separation between adjacent subcarriers. Since these parameters are selectable, our scheme is a completely generalized MT-DS-SS approach. Analysis and simulation results show that by properly choosing these parameters, the level of the spectral sidelobes can be reduced, while slightly changing the width of the mainlobe and simultaneously obtaining good error probability performance, on both additive white Gaussian noise (AWGN) and dispersive fading channels. For even a small number of subcarriers (e.g., 3-5), spectral sidelobes can be reduced by 3-6 decibel (dB) from those of the conventional MT-DS-SS spectrum, with little or no degradation in error probability performance. For larger numbers of subcarriers, additional sidelobe reductions are attainable. In addition, the SSG-MT-DS-SS system has a smaller peak-to-average power ratio (PAPR) than conventional MT-DS-SS when the amplitudes of each subcarrier are not identical.

Current DS-SS transmission systems use identical data rates, identical chip rates, and identical frequency separations for all subcarriers at any given time. An SSG-MT-DS-SS transmission system may allow these parameters to differ and may include a transmission scheme with several desirable properties, including good performance, a shaped power spectrum, and reduced peak-to-average power ratio. The parameters of each subcarrier may be adjusted to shape the power spectral density of the transmitted signal. The parameters that may be varied include the bit energy, data rate, processing gain, and frequency separation between adjacent subcarriers. Hence, the transmission scheme may be termed generalized MT-DS-SS modulation. Due to the attractive spectral shaping achieved, the modulation scheme may be referred to as Spectrally-shaped Generalized Multitone Direct Sequence Spread Spectrum (SSG-MT-DS-SS).

A main disadvantage of OFDM and similar multicarrier schemes is the high peak-to-average power ratio (PAPR) of the transmitted signal. Thus, the amplifier of a multicarrier system must have a large linear range to avoid clipping of the transmitted signal, which reduces amplifier efficiency and increases equipment cost. When each subcarrier of in an SSG-MT-DS-SS transmission system has a distinct amplitude, the PAPR is reduced from that of the conventional MT system. This is attained without using complicated schemes, such as amplitude clipping or coding.

The performance of SSG-MT-DS-SS may be investigated and compared to the performance of conventional MT-DS-SS in terms of, for example, bit error ratio (BER), bandwidth, and PAPR.

Figure 21:
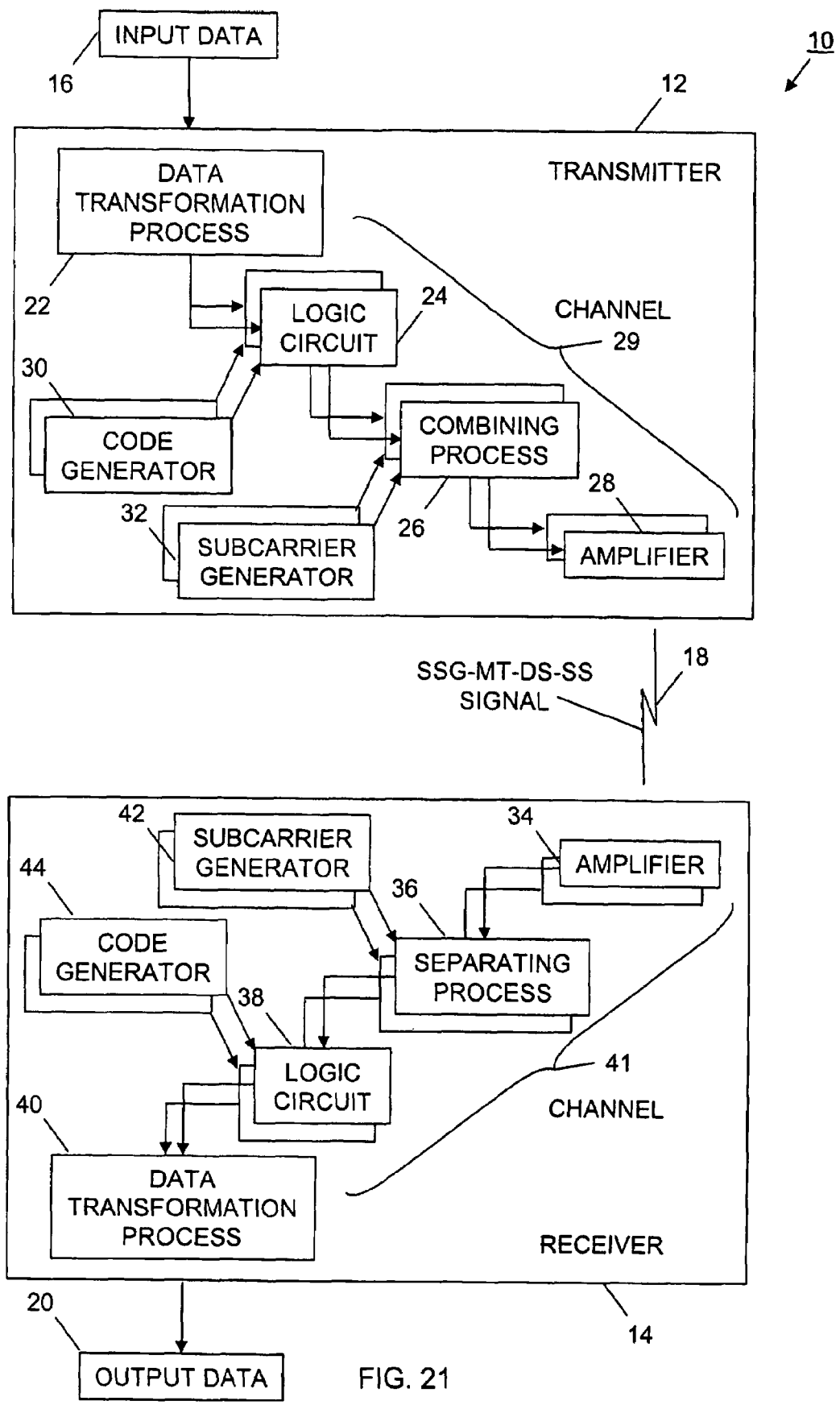
FIG. 21 is a block diagram of an exemplary embodiment of a system communicating via an SSG-MT-DS-SS signal.

With reference to FIG. 21, an exemplary embodiment of an SSG-MT-DS-SS communication system 10 may include an exemplary transmitter 12 and an exemplary receiver 14. The transmitter 12 may receive input data 16 and may provide an SSG-MT-DS-SS signal 18 to the receiver 14 via a wireless communication interface. The receiver 14 may process the SSG-MT-DS-SS signal 18 to form output data 20. Under normal operation, the output data 20 may be representative of the input data 16. The transmitter 12 and receiver 14 may each have a plurality of channels, each corresponding to a different communication frequency, with each channel controlled by at least one parameter. In accordance with the principles of the present invention, the at least one parameter for one channel (in both transmitter and receiver) differs from the at least one parameter for another channel. In an exemplary transmitter 12, at least one of any of data rate, processing gain, frequency separation, and bit energy for one channel differs from another channel. In another exemplary transmitter 12, at least two of any of data rate, processing gain, frequency separation, and bit energy for one channel differ from another channel. Exemplary receivers 14 would have similar differences to receive signals from the exemplary transmitters.

Referring back to FIG. 21, the exemplary transmitter 12 may include a data transformation process 22, a plurality of logic circuits 24, a plurality of combining processes 26, and a plurality of amplifiers 28. Each of these may be implemented in hardware, software, or a combination of hardware and software. The input data, for example, may be serial data. The data transformation process 22 may process the input data 16 to form a plurality of digital data streams. The digital data streams may have different data rates. Each digital data stream from the data transformation process 22 may be processed by a corresponding logic circuit 24, combining process 26, and amplifier 28. As such, each digital data stream and subsequent processing circuits may be referred to as a channel 29. The plurality of channels may be referred to as M channels or, individually, as the first channel through $M^{th}$ channel.

The transmitter 12 may also include a code generator 30 and a subcarrier generator 32 for each channel 29. The code generator 30 may provide a spreading code or chip rate to the logic circuit 24 for the corresponding channel 29. In another embodiment, one or more code generators 30 may provide spreading codes or chip rates to multiple logic circuits 24. The spreading codes or chip rates for the channels may be different.

The logic circuit 24 may use the chip rate to spread the digital data stream to form an analog data signal. The subcarrier generator 32 may provide a subcarrier center frequency to the combining process 26 for the corresponding channel 29. In another embodiment, one or more subcarrier generators 32 may provide subcarrier center frequencies to multiple combining processes 26. Generally, from channel-to-channel a given subcarrier center frequency is separated from adjacent subcarrier center frequencies by an amount that contributes to a bandwidth for each channel. The frequency separation from channel-to-channel may be different. The combining process 26 combines the analog data signal and the subcarrier center frequency to form a modulated subcarrier data signal.

The amplifier 22 may process the modulated subcarrier data signal for the corresponding channel to form a scaled subcarrier data signal. The amplifiers 22 in different channels may scale the corresponding modulated subcarrier data signal differently. In other words, the amplifiers 22 may apply different gains. Of course, the transmitter 12 may also include additional circuitry to combine the multiple subcarrier signals into the SSG-MT-DS-SS signal 18 and an antenna for wireless transmission.

Generally, the receiver 14 may include circuits to receive the SSG-MT-DS-SS signal 18 and circuits to process the received signal in reverse of the processes described above for the transmitter. The receiver 14 may also include, for example, circuits to acquire and lock on to the subcarrier data signal, subcarrier center frequency, spreading code or chip rate, and/or data rate for each channel. In another embodiment, the receiver 14 may know the amplifier gain, subcarrier center frequency, spreading code or chip rate, and/or data rate for each channel through design characteristics, previous tuning, and/or embedded parameters in communication signals.

More specifically, the receiver 14 may include a plurality of amplifiers 34, a plurality of separating processes 36, a plurality of logic circuits 38, and a data transformation process 40. Each of these may be implemented in hardware, software, or a combination of hardware and software. Of course, the receiver 14 may also include an antenna to receive the wireless signal and additional circuitry to filter the SSG-MT-DS-SS signal 18 into individual subcarrier data signals. Each individual subcarrier data signal may be processed by a corresponding amplifier 34, separating process 36, logic circuit 38, and data transformation process 40. As such, each individual subcarrier data signal and subsequent processing circuits may be referred to as a channel 41. Like in the transmitter 12, the plurality of channels in the receiver 14 may be referred to as M channels or, individually, as the first channel through $M^{th}$ channel. The amplifier 34 may process the individual subcarrier data signal for the corresponding channel to reverse the scaling process performed by the transmitter 12 to form a scaled subcarrier data signal. The amplifiers 34 in different channels may scale the corresponding individual subcarrier data signal differently. In other words, the amplifiers 34 may apply different gains.

The receiver 14 may also include a subcarrier generator 42 and a code generator 44 for each channel 41. The subcarrier generator 42 may provide a subcarrier center frequency to the separating process 36 for the corresponding channel 41. In another embodiment, one or more subcarrier generators 42 may provide subcarrier center frequencies to multiple separating processes 36. As for the transmitter 12, the frequency separation from channel-to-channel in the receiver 14 may be different. The separating process 36 reverses the combining process 26 performed by the transmitter 12 by separating the subcarrier center frequency from the scaled subcarrier data signal to form an analog data signal.

The code generator 44 may provide a spreading code or chip rate to the logic circuit 38 for the corresponding channel 41. In another embodiment, one or more code generators 44 may provide spreading codes or chip rates to multiple logic circuits 38. The spreading codes or chip rates for the channels may be different. The logic circuit 38 may use the chip rate to despread the analog data signal to form a digital data stream. This effectively reverses the spreading process performed by the transmitter 12. In another embodiment, the logic circuit 38 may include a summing circuit to combine data from multipath channels associated with the SSG-MT-DS-SS signal 18 with the analog data signal. In still another embodiment, the logic circuit 38 may also include a comparator or another suitable circuit to make a hard decision on the signal level for the digital data stream.

The data transformation process 40 may process the digital data streams from each channel 41 to form the output data 20. The data transformation process 40 may process the digital data streams at different data rates. The output data, for example, may be serial data corresponding to the input data.

Figure 22:
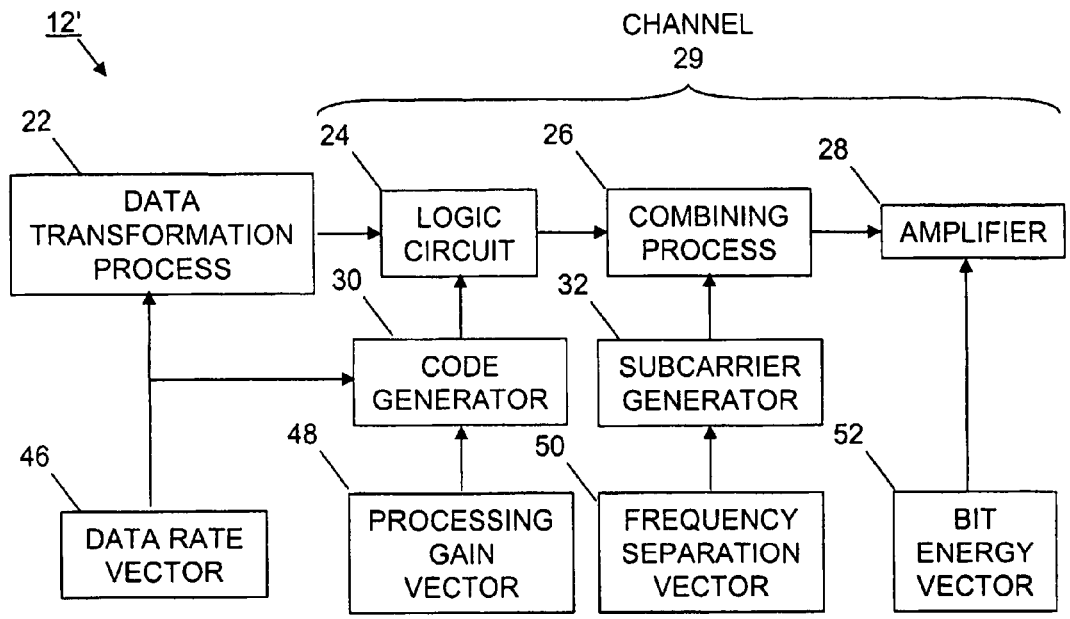
FIG. 22 is a block diagram of another exemplary embodiment of a transmitter adapted to generate an SSG-MT-DS-SS signal.

With reference to FIG. 22, an exemplary embodiment of a transmitter 12' may include the data transformation process 22, logic circuit 24, combining process 26, amplifier 28, code generator 30, and subcarrier generator 32 described above for FIG. 21. The transmitter 12' may also include a data rate vector 46, a processing gain vector 48, a frequency separation vector 50, and a bit energy vector 52. The data rate vector 46, processing gain vector 48, frequency separation vector 50, and bit energy vector 52 are stored values for communication parameters that are used at various stages in the transmitter 12' to control some aspect of the corresponding stage. For example, the values for the vectors may be stored in memory, storage registers, and/or another suitable storage device. In another embodiment, the values may be embedded within the corresponding stage of the transmitter 12'. For example, the data rate vector 46 may be embedded with the data transformation process 22 and code generator 30.

The data rate vector 46 is in communication with the data transformation process 22 and provides the data rate for the digital data stream provided to each channel 29. The data rate vector 46 may include different values for different channels 29. In other words, a first data rate vector value for a first channel may be different from a second data rate vector for a second channel. Any particular data rate vector value may be used for any number of channels. Conversely, the data rate vector 46 may be the same value for all channels. Whether the data rate vector 46 is variable or not variable, the data rate vector values associated with individual or multiple channels may be dynamic, as opposed to static. In other words, the data rate vector value for one or multiple channels may be changed for a given portion of the SSG-MT-DS-SS signal. In one embodiment, the transmitter 12' may include a controller to dynamically change one or more data rate vector values during operations.

The data rate vector 46 and processing gain vector 48 are in communication with the code generator 30. The code generator 30 divides the processing gain vector 48 by the data rate vector 46 to determine the spreading code or chip rate for each corresponding channel 29. The data rate vector 46 is described above for the data transformation process 22. The processing gain vector 48 may include different values for different channels 29. In other words, a first processing gain vector value for a first channel may be different from a second processing gain vector for a second channel. Any particular processing gain vector value may be used for any number of channels. Conversely, the processing gain vector 48 may be the same value for all channels. Whether the processing gain vector 48 is variable or not variable, the processing gain vector values associated with individual or multiple channels may be dynamic, as opposed to static. In other words, the processing gain vector value for one or multiple channels may be changed for a given portion of the SSG-MT-DS-SS signal. In one embodiment, the transmitter 12' may include a controller to dynamically change one or more processing gain vector values during operations.

The frequency separation vector 50 is in communication with the subcarrier generator 32. The subcarrier generator 32 uses the frequency separation vector 50 to determine the subcarrier center frequency for each corresponding channel 29 with respect to the subcarrier center frequency for an adjacent channel. The frequency separation vector 50 may include different values for different channels 29. In other words, a first frequency separation vector value for a first channel may be different from a second frequency separation vector for a second channel. Any particular frequency separation vector value may be used for any number of channels. Conversely, the frequency separation vector 50 may be the same value for all channels. Whether the frequency separation vector 50 is variable or not variable, the frequency separation vector values associated with individual or multiple channels may be dynamic, as opposed to static. In other words, the frequency separation vector value for one or multiple channels may be changed for a given portion of the SSG-MT-DS-SS signal. In one embodiment, the transmitter 12' may include a controller to dynamically change one or more frequency separation vector values during operations.

The bit energy vector 52 is in communication with the amplifier 28 and provides the gain for scaling the modulated subcarrier data signal in each channel 29 to form the scaled subcarrier data signal. The bit energy vector 52 may include different values for different channels 29. In other words, a first bit energy vector value for a first channel may be different from a second bit energy vector for a second channel. Any particular bit energy vector value may be used for any number of channels. Conversely, the bit energy vector 52 may be the same value for all channels. Whether the bit energy vector 52 is variable or not variable, the bit energy vector values associated with individual or multiple channels may be dynamic, as opposed to static. In other words, the bit energy vector value for one or multiple channels may be changed for a given portion of the SSG-MT-DS-SS signal. In one embodiment, the transmitter 12' may include a controller to dynamically change one or more bit energy vector values during operations.

Figure 23:
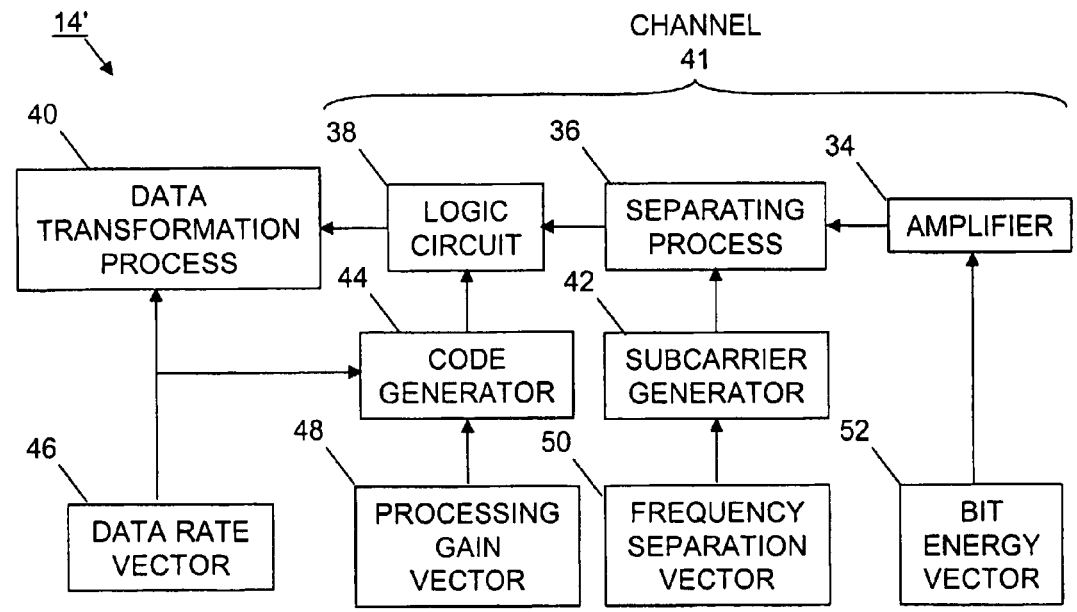
FIG. 23 is a block diagram of another exemplary embodiment of a receiver adapted to receive and process an SSG-MT-DS-SS signal.

With reference to FIG. 23, an exemplary embodiment of a receiver 14' may include the amplifier 34, separating process 36, logic circuit 38, data transformation process 40, subcarrier generator 42, and code generator 44 described above for FIG. 21. The receiver 14' may also include the data rate vector 46, processing gain vector 48, frequency separation vector 50, and bit energy vector 52 described above for FIG. 22. As for the transmitter 12', the data rate vector 46, processing gain vector 48, frequency separation vector 50, and bit energy vector 52 are stored values for communication parameters that are used at various stages in the receiver 14' to control some aspect of the corresponding stage. For example, the values for the vectors may be stored in memory, storage registers, and/or another suitable storage device. In another embodiment, the values may be embedded within the corresponding stage of the receiver 14'. For example, the data rate vector 46 may be embedded with the data transformation process 40 and code generator 44.

The data rate vector 46 is in communication with the data transformation process 40 and provides the data rate of the digital data stream provided to the data transformation process 40 from each channel 41. In one embodiment, the receiver 14' may include a controller to dynamically change one or more data rate vector values during operations.

The data rate vector 46 and processing gain vector 48 are in communication with the code generator 44. The code generator 44 divides the processing gain vector 48 by the data rate vector 46 to determine the spreading code or chip rate associated with the analog data signal provided to the logic circuit 38 for each corresponding channel 41. In one embodiment, the receiver 14' may include a controller to dynamically change one or more processing gain vector values during operations.

The frequency separation vector 50 is in communication with the subcarrier generator 42. The subcarrier generator 42 uses the frequency separation vector 50 to identify the subcarrier center frequency for each corresponding channel 41 with respect to the subcarrier center frequency for an adjacent channel. In one embodiment, the receiver 14' may include a controller to dynamically change one or more frequency separation vector values during operations.

The bit energy vector 52 is in communication with the amplifier 34 and provides the gain used to produce the scaled subcarrier data signal in the transmitter 12' so that a corresponding gain can be used to reverse the amplifying process in the transmitter 12' in each channel 41 to form the scaled subcarrier data signal in the receiver 14'. In one embodiment, the corresponding gain in the receiver 14' may be the reciprocal of the gain used in the transmitter 12' for the corresponding channel. In one embodiment, the receiver 14' may include a controller to dynamically change one or more bit energy vector values during operations.

A block diagram of an exemplary embodiment of an SSG-MT-DS-SS transmitter for the $k^{th}$ user is shown in FIG. 1. For simplicity of exposition, the transmitter may use binary phase shift-keying (BPSK) modulation, but suitable results can also be extended to M-way phase shift keying (MPSK) and quadrature amplitude modulation (QAM). The input data waveform $d^{(k)}(t)$, for example, a stream of binary data with rectangular pulses of bit duration $T_b$, enters the data transformation block denoted by T, to form M parallel data streams. The $i^{th}$ subcarrier of these parallel streams may include unique bit rate $R_{b,i}^{(k)}$, and bit duration $T_{b,i}^{(k)}=1/R_{b,i}^{(k)}$. The transformation block T can be viewed as a generalized S:P conversion. In one embodiment, the transformation block T may include a digital demultiplexer. In another embodiment, the transformation block T may include a logic circuit along with the digital demultiplexer to permit one or more of the unique bit rates $R_{b,i}^{(k)}$, to be dynamically changed during operations. Then, spectral spreading may be performed on the $i^{th}$ data stream by multiplying it by the spreading code $c_i^{(k)}(t)$, with chip rate $R_{c,i}^{(k)}$ and corresponding chip duration $T_{c,i}^{(k)}=1/R_{c,i}^{(k)}$. In one embodiment, the spectral spreading in each channel may include a logic circuit which may perform an exclusive OR operation between the digital data stream and the spreading code and a digital to analog conversion.

The spreading codes may be unique to each subcarrier, and random long codes may be used. Notably, use of the same spreading codes on all subcarriers provides no advantage in dispersive channels or asynchronous multi-user systems, other than conservation of code sequences, which is of little importance with long codes. In addition, the use of multiple distinct spreading codes on the subcarriers may also be advantageous from an "anti-eavesdropping" security perspective.

After spreading, user k's $i^{th}$ subcarrier signal may be up converted by a carrier wave $s_i^{(k)}(t)$. In one embodiment, the converting in each channel may be provided by an upconverter or mixer. Finally, the transmit power of subcarrier i may be scaled by gain $A_i^{(k)}$, and the transmitted signal $v^{(k)}(t)$ may be formed by adding all subcarrier signals. In one embodiment, the scaling in each channel may be provided by an amplifier. In another embodiment, the amplifier may be a variable gain amplifier. The transmitted signal of the $k^{th}$ user can be represented by the following equation (1):

$$v^{(k)}(t) = \sum_{i=1}^{M} v_i^{(k)}(t) \qquad (1)$$

$$= \sum_{i=1}^{M} A_i^{(k)} \sum_{n=-\infty}^{\infty} \left\{ d_i^{(k)}(n) \left[ p_{T_{b,i}^{(k)}}\left(t - nT_{b,i}^{(k)}\right) \sum_{m=0}^{N_i^{(k)}-1} c_i^{(k)}(m) p_{T_{c,i}^{(k)}}\left(t - mT_{c,i}^{(k)}\right) \right] \right\} \cos[2\pi f_{c,i}^{(k)} t]$$

where the following definitions apply:

$A_i^{(k)} = \sqrt{2E_{b,i}^{(k)}/T_{b,i}^{(k)}}$, where $E_{b,i}^{(k)}$ and $T_{b,i}^{(k)}$ are user k's bit energy, and bit duration for the $i^{th}$ subcarrier, respectively;

$d_i^{(k)}(n) \in \{-1,1\}$ is the $n^{th}$ transmitted data bit on the $i^{th}$ subcarrier of user k;

$c_i^{(k)}(m) \in \{-1,1\}$ is the $m^{th}$ chip of the spreading code corresponding to the $i^{th}$ subcarrier of user k, and $N_i^{(k)} = T_{b,i}^{(k)}/T_{c,i}^{(k)}$ is the processing gain of the user k's $i^{th}$ subcarrier;

$s_i^{(k)}(t) = \cos(2\pi f_{c,i}^{(k)} t)$ is the sinusoidal carrier for subcarrier i of user k and $f_{c,i}^{(k)}$ is the carrier frequency of the $i^{th}$ subcarrier of user k; and $p_T^{(t)}$ is the rectangular pulse waveform, equal to one over $0 \leq t \leq T$, and zero elsewhere.

Once again, the SSG-MT-DS-SS scheme can be viewed as a generalized multicarrier/multitone direct sequence spread spectrum (MC/MT-DS-SS) scheme. If each subcarrier has the same data rate, processing gain, and bit energy, this system can be either a multitone direct sequence spread spectrum (MT-DS-SS) or multicarrier direct sequence spread spectrum (MC-DS-SS) system depending on the frequency separation between adjacent subcarriers.

The channel between the receiver and transmitter for the $i^{th}$ subcarrier of user k may be a Nakagami-m dispersive fading channel. The low pass equivalent representation of the impulse response may be represented by the following equation (2):

$$h_i^{(k)}(t) = \sum_{l=0}^{L_i^{(k)}-1} \alpha_{i,l}^{(k)} \exp\left(-j\varphi_{i,l}^{(k)}\right) \delta\left(t - \tau_{i,l}^{(k)}\right) \qquad (2)$$

where $\alpha_{i,l}^{(k)}, \phi_{i,l}^{(k)}, \tau_{i,l}^{(k)}$, are respectively the channel attenuation, phase shift, and delay for the $l^{th}$ path of the channel between transmitter and corresponding receiver of the $i^{th}$ subcarrier of user k.

The number of resolvable paths for user k's $i^{th}$ subcarrier, $L_i^{(k)}$, may be represented by the following equation (3):

$$L_i^{(k)} = \lfloor R_{c,i}^{(k)}/B_c \rfloor + 1 \qquad (3)$$

where $\lfloor x \rfloor$ represents the integer part of x, $R_{c,i}^{(k)}$ is the chip rate of the $i^{th}$ subcarrier of user k, and $B_c$ is the coherence bandwidth of the channel.

The channel attenuation factors may be independent Nakagami-m distributed random processes with probability density function (pdf) given by the following equation (4):

$$p_R(r) = \frac{2}{\Gamma(m)} \left(\frac{m}{\Omega}\right)^m r^{2m-1} e^{-mr^2/\Omega} \qquad (4)$$

where $\Omega = E(R^2)$ and m is defined as $m = \Omega^2/E[(R^2-\Omega)^2]$.

The channel may have an exponentially decaying power delay profile (PDP) with a decay factor of $\eta$. Thus, the average power on the $l^{th}$ tap, for user k's $j^{th}$ subcarrier, may be given by $\Omega_{j,l}^{(k)} = \Omega_{j,0}^{(k)} e^{-\eta l}$ and the sum of all the tap average powers may be normalized to unity. The phase shifts of different paths, different subcarriers, and different users may be independent and uniformly distributed within the interval [0, $2\pi$), and the delays may be independent random variables (RVs), uniformly distributed in [0, $T_b$), where $T_b$ is the bit duration for a single carrier (SC) transmission scheme with the same total data rate and bandwidth as the SSG-MT-DS-SS system.

If there are a total of K asynchronous users, and the channel model is as given in equation (3), the received signal may be represented by the following equation (5):

$$r(t) = \qquad (5)$$

$$\sum_{k=1}^{K} \sum_{i=1}^{M} \sum_{l=0}^{L_i^{(k)}-1} \alpha_{i,l}^{(k)} A_i^{(k)} d_i^{(k)}\left(t - \tau_{i,l}^{(k)}\right) c_i^{(k)}\left(t - \tau_{i,l}^{(k)}\right) \cos\left(2\pi f_i^{(k)} t - \theta_{i,l}^{(k)}\right) + n(t)$$

where from equation (1) the product of the $n^{th}$ bit $d_i^{(k)}(n)$ and its pulse $p_{T_{b,i}}^{(k)}(t)$ as $d_i^{(k)}(t)$ has been abbreviated, and likewise for the spreading waveform $c_i^{(k)}(t)$. The phases $\theta_{i,l}^{(k)} = 2\pi f_i^{(k)} \tau_{i,l}^{(k)} + \phi_{i,l}^{(k)}$ may be independent identically distributed (i.i.d.) uniform RVs on [0, $2\pi$), and n(t) is AWGN with double sided PSD of $N_0/2$ W/Hz.

Figure 2:
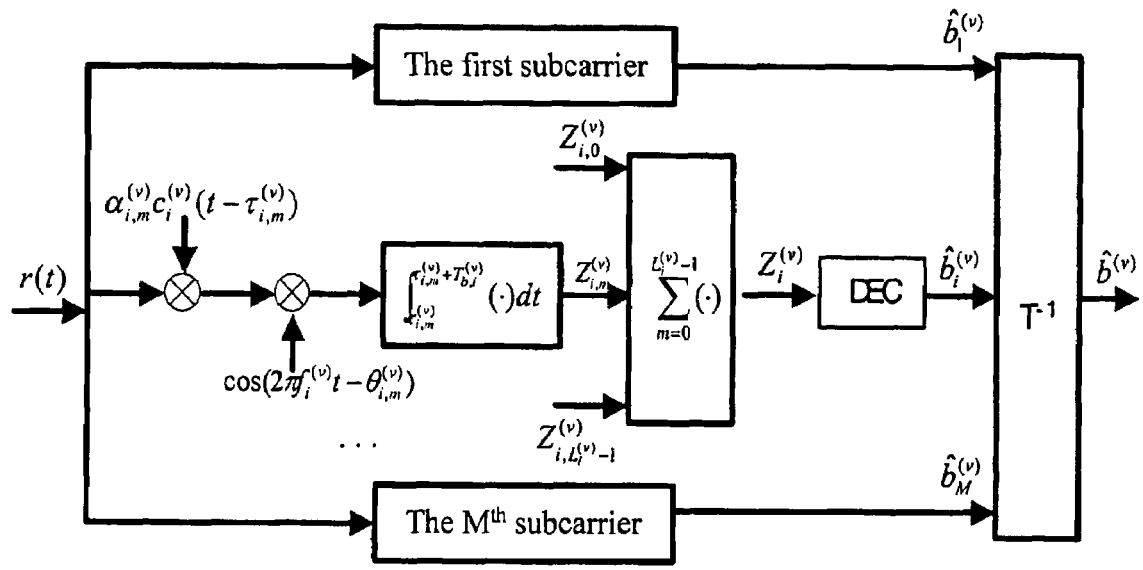
FIG. 2 is a block diagram of an exemplary embodiment of a receiver adapted to receive and process an SSG-MT-DS-SS signal.

An exemplary embodiment of an SSG-MT-DS-SS receiver may have knowledge of the transmitted signal parameters, i.e., data rates, bit energies, processing gains, and frequency separations, of the desired user. Additionally, in another embodiment, the receiver may be capable of synchronizing to each multipath echo of the desired user's signal, and estimating its attenuation factor and phase. A block diagram of an exemplary embodiment of an SSG-MT-DS-SS receiver is shown in FIG. 2, where the $L_i^{(k)}$ correlator outputs may be maximal ratio combined (MRC) to form the decision statistic for subcarrier i of user k. The decision statistic may be represented by the following equation (6):

$$Z_i^{(k)} = \sum_{q=0}^{L_i^{(k)}-1} Z_{i,q}^{(k)} \qquad (6)$$

where the correlator output for the $q^{th}$ tap of subcarrier i for user k may be represented by the following equation (7):

$$Z_{i,q}^{(k)} = \int_{\tau_{i,q}^{(k)}}^{\tau_{i,q}^{(k)}+T_{b,i}^{(k)}} r(t) \alpha_{i,q}^{(k)} c_i^{(k)}\left(t - \tau_{i,q}^{(k)}\right) \cos\left(2\pi f_i^{(k)} t - \theta_{i,q}^{(k)}\right) dt \qquad (7)$$

A hard decision is made based on the sign of the decision metric $Z_i^{(k)}$. After the hard decision, the M parallel data estimates are parallel-to-serial ($T^{-1}$) converted for output. In one embodiment, the receiver may include an antenna, a low noise amplifier, and a bandpass filter that provide the r(t) data signal, a downconverter or mixer in each subcarrier channel that introduces the cosine function, a logic circuit in each subcarrier channel that introduces an analog to digital conversion and the spreading codes, a digital accumulator that performs the integration function to complete the despreading operation, and a digital multiplexer that combines the parallel subcarrier channels into a serial data signal. In another embodiment, the receiver may also include a threshold comparator that performs the hard decision. In still another embodiment, the receiver may also include a summation circuit that combines the digital data stream $Z_{i,m}^{(v)}$ with other digital data streams from multipath signals $Z_{i,L_i^{(v)}-1}^{(v)}$ associated with the corresponding channel.

Without loss of generality, the delay $\tau_{i,0}^{(k)}$ in equation (5) can be set equal to zero, the $0^{th}$ bit $d_i^{(k)}(0)$ can be analyzed for (condition on). Upon substituting equation (5) into equation (7), $Z_{i,q}^{(k)}$ can be expressed as the following equation (8):

$$Z_{i,q}^{(k)} = D + N + \sum_{\substack{l=0 \\ l \neq q}}^{L_i^{(k)}-1} I_{1,l} + \sum_{\substack{j=1 \\ j \neq i}}^{M} \sum_{l=0}^{L_j^{(k)}-1} I_{2,j,l} + \sum_{\substack{u=1 \\ u \neq k}}^{K} \sum_{l=0}^{L_i^{(u)}-1} I_{3,l}^{(u)} + \sum_{\substack{u=1 \\ u \neq k}}^{K} \sum_{\substack{j=1 \\ j \neq i}}^{M} \sum_{l=0}^{L_j^{(u)}-1} I_{4,j,l}^{(u)} \tag{8}$$

where D is the desired signal given by $D = A_i^{(k)} T_{b,i}^{(k)} d_i^{(k)}(0)[\alpha_{i,q}^{(k)}]^2/2$, and N is the AWGN noise sample, which is zero mean and has variance $[\alpha_{i,q}^{(k)}]^2 N_0 T_{b,i}^{(k)}/4$.

The interference terms may be described as follows. For example, $I_{1,l}$ is the interference from different paths (l) of the same subcarrier of the same user, which can be represented by the following equation (9):

$$I_{1,l} = \frac{\alpha_{i,l}^{(k)} \alpha_{i,q}^{(k)} A_i^{(k)}}{2} \int_0^{T_{b,i}^{(k)}} d_i^{(k)}(t - \tau_{i,l}^{(k)}) c_i^{(k)}(t - \tau_{i,l}^{(k)}) c_i^{(k)}(t) \cos[\phi_{(i,q;i,l)}^{(k,k)}] dt \tag{9}$$

Another interference term $I_{2,j,l}$, which is the interference from the same user, but from different subcarriers (j) and all paths, may be represented by the following equation (10):

$$I_{2,j,l} = \frac{\alpha_{j,l}^{(k)} \alpha_{i,q}^{(k)} A_j^{(k)}}{2} \int_0^{T_{b,i}^{(k)}} d_j^{(k)}(t - \tau_{j,l}^{(k)}) c_j^{(k)}(t - \tau_{j,l}^{(k)}) c_i^{(k)}(t)$$
$$\cos(2\pi \Delta f_{i,j}^{(k,k)} t - \phi_{(i,q;j,l)}^{(k,k)}) dt \tag{10}$$

Additionally, interference from different paths (l) of the same subcarrier, but different users (u) is $I_{3,l}^{(u)}$ and may be represented by the following equation (11):

$$I_{3,l}^{(u)} = \frac{\alpha_{i,l}^{(u)} \alpha_{i,q}^{(k)} A_i^{(u)}}{2} \int_0^{T_{b,i}^{(k)}} d_i^{(u)}(t - \tau_{i,l}^{(u)}) c_i^{(u)}(t - \tau_{i,l}^{(u)}) c_i^{(k)}(t) \cos[\phi_{(i,q;i,l)}^{(k,u)}] dt \tag{11}$$

Finally, the interference from all paths (l) of different users' (u) different subcarriers (j) can be represented by the following equation (12):

$$I_{4,j,l}^{(u)} = \frac{\alpha_{j,l}^{(u)} \alpha_{i,q}^{(k)} A_j^{(u)}}{2} \int_0^{T_{b,i}^{(k)}} d_j^{(u)}(t - \tau_{j,l}^{(u)}) c_j^{(u)}(t - \tau_{j,l}^{(u)}) c_i^{(k)}(t)$$
$$\cos(2\pi \Delta f_{i,j}^{(k,u)} t - \phi_{(i,q;j,l)}^{(k,u)}) dt \tag{12}$$

In equations (9)-(12), $\Delta f_{i,j}^{(k,u)} = f_j^{(u)} - f_i^{(k)}$ is the carrier frequency difference between the $i^{th}$ and the $j^{th}$ subcarriers of users k and u, and the phase difference between the $q^{th}$ path of the $i^{th}$ subcarrier of user k and the $l^{th}$ path of the $j^{th}$ subcarrier of user u is $\phi_{(i,q;j,l)}^{(k,u)} = \theta_{i,q}^{(k)} - \theta_{j,l}^{(u)}$. As with the $\theta$'s, these phases are also i.i.d. RVs uniformly distributed within [0, 2π). Via the assumption of independent random data bits and spreading codes, both with zero mean, all the interference terms in equations (9)-(12) may be zero mean.

Since many of the parameters are allowed to vary in the generalized scheme, it is convenient to classify a given SSG-MT-DS-SS scheme through the use of a set of parameter vectors. For example, $R_b$, N, $E_b$, and $\Delta f$ parameter vectors may be used individually or in any combination. The $R_b$, N, and $E_b$ vectors may be of length M. The $\Delta f$ vector may be of length M−1, with its $j^{th}$ element equal to the frequency difference between subcarriers j and j+1. The $E_b$ vector may be viewed in terms of relative bit energy among the subcarriers. Similarly, $R_b$ may be a vector of relative bit rates. For example, if M=3, and data rates of $R_{b,1}$=1 Megabit per second (Mbps), $R_{b,2}$=2 Mbps, $R_{b,3}$=1 Mbps are used, processing gains $N_1$=50, $N_2$=200, $N_3$=50, equal energies on all subcarrier bits, and frequency separations equal to $R_{b,1}/2$ Hz, the parameters values are $R_b$=[1, 2, 1], N=[1, 4, 1], $E_b$=[1, 1, 1], and $\Delta f$=[0.5, 0.5], where, in this example, the bit rates and frequency separations are normalized by $R_{b,1}$, and the processing gains are normalized by $N_1$.

To determine the bit error ratio (BER), the variances of the interference terms may be obtained. If $E_b$ and $\Delta f$ are left unconstrained, the combinations of different parameter values can be divided into nine distinct cases for analysis based upon the data rate and processing gain relationships between the $i^{th}$ subcarrier of user k and the $j^{th}$ subcarrier of user u. Specifically, for each possible magnitude relation (>, =, <) between data rates on subcarriers i and j of users k and u, there are the same three possible relations for the processing gains on these subcarriers, yielding nine possible combinations. To describe the relationship between two different subcarriers, i.e., the $i^{th}$ and $j^{th}$ subcarrier of users k and k, the following additional parameters may be defined:

Data rate ratio: $\lambda_{i,j}^{(k,u)} = R_{b,i}^{(k)}/R_{b,j}^{(u)}$;

where $\lambda_{i,j}^{(k,u)}$ is an integer when $R_{b,i}^{(k)} > R_{b,j}^{(u)}$; and Chip duration ratio: $\mu_{i,j}^{(k,u)} = T_{c,i}^{(k)}/T_{c,j}^{(u)}$;

where, similar to our use of $\lambda_{i,j}^{(k,u)}$, $\mu_{i,j}^{(k,u)}$ is an integer when $T_{c,i}^{(k)} > T_{c,j}^{(u)}$.

The integrals of all the interference terms defined by equations (9)-(12) may be of the form represented by the following equation (13):

$$R_{i,j}^{(k,u)} = \int_0^{T_{b,i}^{(k)}} d_j^{(u)}(t - \tau_{j,l}^{(u)}) c_j^{(u)}(t - \tau_{j,l}^{(u)}) c_i^{(k)}(t) g(t) dt \tag{13}$$

where $g(t) = \cos(2\pi \Delta f_{i,j}^{(k,u)} t - \phi_{(i,q;j,l)}^{(k,u)})$. When i=j and u=k, $R_{i,j}^{(k,u)}$ is the integral in equation (9); when i≠j and u=k, it is the integral in (10); and when u≠k it becomes the integral in either equation (11) or equation (12), depending on the values of the $\Delta f_{i,j}^{(k,u)}$. Since zero mean data bits are assumed and random spreading codes are used on all subcarriers, $R_{i,j}^{(k,u)}$ can be approximated as a zero mean Gaussian RV, which implies that each of the interference terms in equation (8) is also a zero mean Gaussian RV. The BER performance can hence be obtained with knowledge of the variances.

An example analysis of the variance of $R_{i,j}^{(k,u)}$ is provided below under the heading "Example Analysis of Correlation Integral in Equation (13)." Table 1 lists the variance of integral $R_{i,j}^{(k,u)}$ for the nine cases.

With the variances of the $R_{i,j}^{(k,u)}$ terms, the variance of the $i^{th}$ correlator output for the $q^{th}$ path may be represented by the following equation (14):

$$\mathrm{var}[Z_{i,q}^{(k)}] = \frac{[\alpha_{i,q}^{(k)}]^2 N_0 T_{b,i}^{(k)}}{4} + \frac{[\alpha_{i,q}^{(k)} A_i^{(k)}]^2 \mathrm{var}[R_{i,i}^{(k,k)}]}{4} \sum_{\substack{l=0 \\ l \neq q}}^{L_i^{(k)}-1} \Omega_{i,l}^{(k)} + \qquad (14)$$

TABLE 1

Variance of Integral $R_{i,j}^{(k,u)}$ of Equation (13).

| Case | | Variance of $R_{i,j}^{(k,u)}$ |
|---|---|---|
| 1. $\lambda_{i,j}^{(k,u)} = 1$, $\mu_{i,j}^{(k,u)} = 1$ | $\Delta f_{i,j}^{(k,u)} = 0$ | $[T_{b,i}^{(k)}]^2 / (3N_i^{(k)})$ |
| | $\Delta f_{i,j}^{(k,u)} \neq 0$ | $\dfrac{N_i^{(k)}}{2(\pi \Delta f_{i,j}^{(k,u)})^2}\{1 - \mathrm{sinc}[2\Delta f_{i,j}^{(k,u)} T_{c,i}^{(k)}]\}$ |
| 2. $\lambda_{i,j}^{(k,u)} = 1$, $\mu_{i,j}^{(k,u)} > 1$ | $\Delta f_{i,j}^{(k,u)} = 0$ | $\dfrac{N_i^{(k)}}{2}\left\{\dfrac{2}{3} + (\mu_{i,j}^{(k,u)} - 1)\right\}[T_{c,j}^{(u)}]$ |
| | $\Delta f_{i,j}^{(k,u)} \neq 0$ | $\dfrac{N_i^{(k)}}{2(\pi \Delta f_{i,j}^{(k,u)})^2}\{1 - \mathrm{sinc}[2\Delta f_{i,j}^{(k,u)} T_{c,j}^{(u)}] + (\mu_{i,j}^{(k,u)} - 1)\sin^2[\pi \Delta f_{i,j}^{(k,u)} T_{c,j}^{(u)}]\}$ |
| 3. $\lambda_{i,j}^{(k,u)} = 1$, $\mu_{i,j}^{(k,u)} < 1$ | $\Delta f_{i,j}^{(k,u)} = 0$ | $\dfrac{N_j^{(u)}}{2}\left(\dfrac{2}{3} + (1/\mu_{i,j}^{(k,u)} - 1)\right)(T_{c,i}^{(k)})^2$ |
| | $\Delta f_{i,j}^{(k,u)} \neq 0$ | $\dfrac{N_j^{(u)}}{2(\pi \Delta f_{i,j}^{(k,u)})^2}\{1 - \mathrm{sinc}[2\Delta f_{i,j}^{(k,u)} T_{c,i}^{(k)}] + (1/\mu_{i,j}^{(k,u)} - 1)\sin^2[\pi \Delta f_{i,j}^{(k,u)} T_{c,i}^{(k)}]\}$ |
| 4. $\lambda_{i,j}^{(k,u)} > 1$, $\mu_{i,j}^{(k,u)} = 1$ | $\Delta f_{i,j}^{(k,u)} = 0$ | $[T_{b,i}^{(k)}]^2 / (3N_i^{(k)})$ |
| | $\Delta f_{i,j}^{(k,u)} \neq 0$ | $\dfrac{N_i^{(k)}}{2(\pi \Delta f_{i,j}^{(k,u)})^2}\{1 - \mathrm{sinc}[2\Delta f_{i,j}^{(k,u)} T_{c,i}^{(k)}]\}$ |
| 5. $\lambda_{i,j}^{(k,u)} > 1$, $\mu_{i,j}^{(k,u)} > 1$ | $\Delta f_{i,j}^{(k,u)} = 0$ | $\dfrac{N_i^{(k)}}{2}\left\{\dfrac{2}{3} + (\mu_{i,j}^{(k,u)} - 1)\right\}[T_{c,j}^{(u)}]^2$ |
| | $\Delta f_{i,j}^{(k,u)} \neq 0$ | $\dfrac{N_i^{(k)}}{2(\pi \Delta f_{i,j}^{(k,v)})^2}\{1 - \mathrm{sinc}[2\Delta f_{i,j}^{(k,u)} T_{c,j}^{(u)}] + (\mu_{i,j}^{(k,u)} - 1)\sin^2[\pi \Delta f_{i,j}^{(k,u)} T_{c,j}^{(u)}]\}$ |
| 6. $\lambda_{i,j}^{(k,u)} > 1$, $\mu_{i,j}^{(k,u)} < 1$ | $\Delta f_{i,j}^{(k,u)} = 0$ | $\dfrac{N_i^{(k)} \mu_{i,j}^{(k,u)}}{2}\left(\dfrac{2}{3} + (1/\mu_{i,j}^{(k,u)} - 1)\right)(T_{c,j}^{(k)})^2$ |
| | $\Delta f_{i,j}^{(k,u)} \neq 0$ | $\dfrac{N_i^{(k)} \mu_{i,j}^{(k,u)}}{2(\pi \Delta f_{i,j}^{(k,u)})^2}\{1 - \mathrm{sinc}[2\Delta f_{i,j}^{(k,u)} T_{c,i}^{(k)}] + (1/\mu_{i,j}^{(k,u)} - 1)\sin^2[\pi \Delta f_{i,j}^{(k,v)} T_{c,j}^{(k)}]\}$ |
| 7. $\lambda_{i,j}^{(k,u)} < 1$, $\mu_{i,j}^{(k,u)} = 1$ | $\Delta f_{i,j}^{(k,u)} = 0$ | $\dfrac{\lambda_{i,j}^{(k,u)} N_j^{(u)}}{3}[T_{c,j}^{(k)}]^2$ |
| | $\Delta f_{i,j}^{(k,u)} \neq 0$ | $\dfrac{\lambda_{i,j}^{(k,u)} N_j^{(u)}}{2(\pi \Delta f_{i,j}^{(k,u)})^2}\{1 - \mathrm{sinc}[2\Delta f_{i,j}^{(k,u)} T_{c,i}^{(k)}]\}$ |
| 8. $\lambda_{i,j}^{(k,u)} < 1$, $\mu_{i,j}^{(k,u)} > 1$ | $\Delta f_{i,j}^{(k,u)} = 0$ | $\dfrac{N_i^{(k)}}{2}\left\{\dfrac{2}{3} + (\mu_{i,j}^{(k,u)} - 1)\right\}[T_{c,j}^{(v)}]^2$ |
| | $\Delta f_{i,j}^{(k,u)} \neq 0$ | $\dfrac{N_i^{(k)}}{2(\pi \Delta f_{i,j}^{(k,u)})^2}\{1 - \mathrm{sinc}[2\Delta f_{i,j}^{(k,u)} T_{c,j}^{(u)}] + (\mu_{i,j}^{(k,u)} - 1)\sin^2[\pi \Delta f_{i,j}^{(k,u)} T_{c,j}^{(u)}]\}$ |
| 9. $\lambda_{i,j}^{(k,u)} < 1$, $\mu_{i,j}^{(k,u)} < 1$ | $\Delta f_{i,j}^{(k,u)} = 0$ | $\dfrac{\lambda_{i,j}^{(k,u)} N_j^{(u)}}{2}\left\{\dfrac{2}{3} + (1/\mu_{i,j}^{(k,u)} - 1)\right\}[T_{c,j}^{(k)}]^2$ |
| | $\Delta f_{i,j}^{(k,u)} \neq 0$ | $\dfrac{\lambda_{i,j}^{(k,u)} N_j^{(u)}}{2(\pi \Delta f_{i,j}^{(k,u)})^2}\{1 - \mathrm{sinc}[2\Delta f_{i,j}^{(k,u)} T_{c,i}^{(k)}] + (1/\mu_{i,j}^{(k,u)} - 1)\sin^2[\pi \Delta f_{i,j}^{(k,u)} T_{c,j}^{(k)}]\}$ |

-continued $$\frac{[\alpha_{i,q}^{(k)}]^2}{4} \sum_{\substack{j=1 \\ j \neq i}}^{M} \sum_{l=0}^{L_j^{(k)}-1} \Omega_{j,l}^{(k)}[A_j^{(k)}]^2 \text{var}[R_{i,j}^{(k,k)}] +$$

$$\frac{[\alpha_{i,q}^{(k)}A_i^{(u)}]^2 \text{var}[R_{i,i}^{(k,u)}]}{4} \sum_{\substack{u=1 \\ u \neq k}}^{K} \sum_{l=0}^{L_i^{(u)}-1} \Omega_{i,l}^{(u)} +$$

$$\frac{[\alpha_{i,q}^{(k)}]^2}{4} \sum_{\substack{u=1 \\ u \neq k}}^{K} \sum_{\substack{j=1 \\ j \neq i}}^{M} \sum_{l=0}^{L_j^{(u)}-1} \Omega_{j,l}^{(u)}[A_j^{(u)}]^2 \text{var}[R_{i,j}^{(k,u)}]$$

By assuming the interference terms are independent additive Gaussian RVs, the MRC decision statistic given by equation (6) may be a Gaussian RV, with its mean and variance respectively represented by the following equations (15) and (16):

$$E[Z_i^{(k)}] = \sum_{q=0}^{L_i^{(k)}-1} E[Z_{i,q}^{(k)}] = \frac{1}{2} A_i^{(k)} T_{b,i}^{(k)} d_i^{(k)}(0) \sum_{q=0}^{L_i^{(k)}-1} [\alpha_{i,q}^{(k)}]^2 \quad (15)$$

$$\text{var}[Z_i^{(k)}] = \sum_{q=0}^{L_i^{(k)}-1} \text{var}[Z_{i,q}^{(k)}] \quad (16)$$

The error probability for the $i^{th}$ subcarrier of user k can be expressed by the following equation (17):

$$P_{b,i}^{(k)}(\gamma_i^{(k)}) = Q\left(\sqrt{\frac{(E[Z_i^{(k)}])^2}{\text{var}[Z_i^{(k)}]}}\right) = Q\left(\sqrt{2\gamma_i^{(k)}}\right) \quad (17)$$

where $Q(x) = \int_x^\infty e^{-t^2/2} dt/\sqrt{2\pi}$. See, e.g., J. G. Proakis, Digital Communications, 4$^{th}$ ed., New York: McGraw-Hill, 2000 the contents of which are fully incorporated herein by reference. Different subcarrier channels of different users may have the same PDP distribution. The average power of the $j^{th}$ subcarrier of user k's $l^{th}$ tap, $\Omega_{j,l}^{(k)}$ may be replaced by $1/L_i^{(k)}$. This approximation works well for small values of decay factor $\eta$. The instantaneous signal-to-noise ratio (SNIR) may be represented by the following equation (18):

$$\gamma_i^{(k)} = \left\{ \frac{N_0}{E_{b,i}^{(k)}} + \frac{2(L_i^{(k)}-1)}{3N_i^{(k)}L_i^{(k)}} + SUI_i^{(k)} + MUI_i^{(k)} \right\}^{-1} \sum_{q=0}^{L_i^{(k)}-1} [\alpha_{i,q}^{(k)}]^2 \quad (18)$$

$$= \sum_{q=0}^{L_i^{(k)}-1} \overline{\gamma}_i^{(k)} [\alpha_{i,q}^{(k)}]^2$$

where $\overline{\gamma}_i^{(k)}$ may be represented by the following equation (19):

$$\overline{\gamma}_i^{(k)} = \left\{ \frac{N_0}{E_{b,i}^{(k)}} + \frac{2(L_i^{(k)}-1)}{3N_i^{(k)}L_i^{(k)}} + SUI_i^{(k)} + MUI_i^{(k)} \right\}^{-1} \quad (19)$$

where the second term in equation (19) is the "same user inter-chip interference." The (inter-subcarrier) same user interference (SUI) and multiple user interference (MUI) seen by the $i^{th}$ subcarrier of user k may be defined by the following equations (20) and (21):

$$SUI_i^{(k)} = 2 \sum_{\substack{j=1 \\ j \neq i}}^{M} \sum_{l=0}^{L_j^{(k)}-1} \frac{\Omega_{j,l}^{(k)} E_{b,j}^{(k)} \text{var}[R_{i,j}^{(k,k)}]}{E_{b,i}^{(k)} T_{b,i}^{(k)} T_{b,j}^{(k)}} \quad (20)$$

$$MUI_i^{(k)} = 2 \sum_{\substack{u=1 \\ u \neq k}}^{K} \sum_{j=1}^{M} \sum_{l=0}^{L_j^{(u)}-1} \frac{\Omega_{j,l}^{(u)} E_{b,j}^{(u)} \text{var}[R_{i,j}^{(k,u)}]}{E_{b,i}^{(k)} T_{b,i}^{(k)} T_{b,j}^{(u)}} \quad (21)$$

To obtain the average BER, equation (17) may be averaged over the joint pdf of $\alpha_{i,0}^{(k)}, \alpha_{i,1}^{(k)} \ldots a_{i,L_i^{(k)}-1}^{(k)}$. Since the channel attenuation factors are independent RVs, the joint pdf can be expressed by the product of the individual pdfs of the $\alpha_{i,q}^{(k)}$ or can be defined by the following equation (22):

$$P_{\alpha_{i,1}^{(k)}, \alpha_{i,0}^{(k)}, \alpha_{i,1}^{(k)} \ldots, \alpha_{i,L_i^{(k)}-1}^{(k)}}\left(\alpha_{i,0}^{(k)}, \alpha_{i,1}^{(k)} \ldots, \alpha_{i,L_i^{(k)}-1}^{(k)}\right) = \prod_{q=0}^{L_i^{(k)}-1} p_{\alpha_{i,q}^{(k)}}(\alpha_{i,q}^{(k)}) \quad (22)$$

With the aid of the form of Q-function represented by the following equation (23):

$$Q(x) = \frac{1}{\pi} \int_0^{\pi/2} \exp\left(-\frac{x^2}{2\sin^2\theta}\right) d\theta \quad (23)$$

the average BER can be represented by the following equation (24):

$$P_{b,i}^{(k)} = \frac{1}{\pi} \underbrace{\int_0^\infty \ldots \int_0^\infty}_{L_i^{(k)} \text{fold}} \int_0^{\pi/2} \exp\left(-\frac{\sum_{q=0}^{L_i^{(k)}-1} \overline{\gamma}_i^{(k)}[\alpha_{i,q}^{(k)}]^2}{\sin^2\theta}\right) \quad (24)$$

$$\prod_{q=0}^{L_i^{(k)}-1} p_{\alpha_{i,q}^{(k)}}(\alpha_{i,q}^{(k)}) d\theta d\alpha_{i,0}^{(k)} d\alpha_{i,1}^{(k)} \ldots d\alpha_{i,L_i^{(k)}-1}^{(k)}$$

$$= \frac{1}{\pi} \int_0^{\pi/2} \prod_{q=0}^{L_i^{(k)}-1} G_{i,q}^{(k)}(\theta) d\theta$$

where $G_{i,q}^{(k)}(\theta)$ may be represented by the following equation (25):

$$G_{i,q}^{(k)}(\theta) = \int_0^\infty \exp\left(-\frac{\overline{\gamma}_i^{(k)}[\alpha_{i,q}^{(k)}]^2}{\sin^2\theta}\right) p_{\alpha_{i,q}^{(k)}}(\alpha_{i,q}^{(k)}) d\alpha_{i,q}^{(k)} \quad (25)$$

Since $\alpha_{i,q}^{(k)}$ may be Nakagami-m distributed, as in equation (4), a closed form for equation (25) can be found via the moment generation function (MGF), which may be represented by the following equation (26):

$$G_{i,q}^{(k)}(\theta) = \left(\frac{m\sin^2\theta}{\overline{\gamma}_{i,q}^{(k)} + \sin^2\theta}\right)^m \quad (26)$$

In equation (25), $\overline{\gamma}_{i,q}^{(k)}$ may be the average SNIR on the $q^{th}$ tap of the $i^{th}$ subcarrier of the desired $k^{th}$ user. This can be expressed in terms of the average SNIR of the $0^{th}$ tap of the same subcarrier as in the following equation (27):

$$\overline{\gamma}_{i,q}^{(k)} = \overline{\gamma}_i^{(k)} \exp(-\eta q)/\Omega_{i,0}^{(k)} \quad (27)$$

Now, substituting, equation (26) into equation (24), the average bit error probability may be represented by the following equation (28):

$$P_b = \frac{1}{\pi}\int_0^{\pi/2} \prod_{q=0}^{L_i^{(k)}-1}\left(\frac{m\sin^2\theta}{\overline{\gamma}_{i,q}^{(k)} + \sin^2\theta}\right)^m d\theta \quad (28)$$

The transmitted signal of equation (1) may be represented by the following equation (29):

$$v(t) = \sum_{i=1}^M A_i X_i(t)\cos[2\pi f_{ci} t] \quad (29)$$

where $X_i(t)$ may be the product of the pseudo-noise (PN) spreading sequence and the data bit of the $i^{th}$ subcarrier, which may be one element of an equiprobable binary sequence of $\pm 1$'s and, as defined in equation (1), $A_i = \sqrt{2E_{b,i}/T_{b,i}}$ may be the amplitude of the $i^{th}$ subcarrier. The PAPR of the transmitted signal $v(t)$ may be represented by the following equation (30):

$$PAPR(v) = \frac{[\max(v)]^2}{P_{avg}} \quad (30)$$

The PAPR comparison between conventional MT-DS-SS and SSG-MT-DS-SS may be made under the condition that the two systems have the same total data rate input to the transmitter, the same average transmitting power, and the same number of subcarriers; thus the two systems may have the same average power, $P_{avg}$, and a lower peak power may lower the PAPR. The SSG-MT-DS-SS system may have a smaller peak power compared to that of conventional MT-DS-SS. Since the $X_i(t)$ may be independent for all subcarriers, the peak value of the transmitted signal may be obtained when all subcarriers add constructively, and this peak value is $$\sum_{i=1}^M A_i.$$

When $x=y$, one may find $x^2+y^2 \geq 2xy$. Then, an upper bound on the peak value is represented by the following equation (31):

$$[\max(v)]^2 = \quad (31)$$

$$\left(\sum_{i=1}^M A_i\right)^2 = \sum_{i=1}^M A_i \sum_{j=1}^M A_j = \sum_{i=1}^M\sum_{j=1}^M A_i A_j \leq \frac{1}{2}\sum_{i=1}^M\sum_{j=1}^M (A_i^2 + A_j^2) =$$

$$\frac{M}{2}\left(\sum_{i=1}^M A_i^2 + \sum_{j=1}^M A_j^2\right) = M\sum_{i=1}^M A_i^2$$

The peak value may reach its upper bound when $A_i$ is the same for the M subcarriers, which is the case for conventional MT-DS-SS. In SSG-MT-DS-SS, different bit energies and/or different data rates are allowed on each subcarrier. Therefore, each subcarrier may have different amplitude. As a result, the peak value of SSG-MT-DS-SS may be less than that of conventional MT-DS-SS.

The effect of different parameter sets on SSG-MT-DS-SS performance may be investigated in terms of the power spectral density (PSD) and bit error probability $P_b$. Additionally, the performance of SSG-MT-DS-SS may be compared with conventional MT-DS-SS under the conditions that both systems have the same number of subcarriers, the same total input data rate, and the same average transmit power. For instance, one may compare performance of SSG-MT-DS-SS with parameters $R_b$=[1,4,1]Mbps, N=[128,32,128], $E_b$=[1,1,1]µJ, and $\Delta f$=[1,1] Megahertz (MHz) with a 3-subcarrier conventional MT-DS-SS system, in which each subcarrier has identical data rates $R_b$=2 Mbps, processing gains N=128, and bit energies $E_b$=1 µJ, and frequency separation between adjacent subcarriers of $\Delta f$=2 MHz. In this case, both systems, i.e., SSG-MT-DS-SS and the conventional MT-DS-SS, have the same total data rate of 6 Mbps and the same transmit power of 6 watts. In the description provided herein, the superscript s and c may be used to represent the SSG-MT-DS-SS and conventional MT-DS-SS, respectively.

For binary modulation, the $i^{th}$ subcarrier of MT/MC-DS-SS may transmit positive and negative rectangular pulses of duration $T_{c,i}$. In this case, before upconversion, the power spectral density of each subcarrier may be represented as $2E_{c,i}\sin c^2(T_{c,i}f)$, where $E_{c,i}$ is the chip energy of subcarrier i, and $\sin c(x) = \sin(\pi x)/(\pi x)$. Since the data and spreading codes of each subcarrier are independent, the power spectral density of the transmitted signal can be expressed as the sum of the power spectra of the individual subcarriers as in the following equation (32):

$$S_v(f) = 2\sum_{i=1}^M E_{c,i}\text{sinc}^2[T_{c,i}(f - f_{ci})] \quad (32)$$

where $f_{ci}$ is the $i^{th}$ subcarrier's center frequency.

Figure 3:
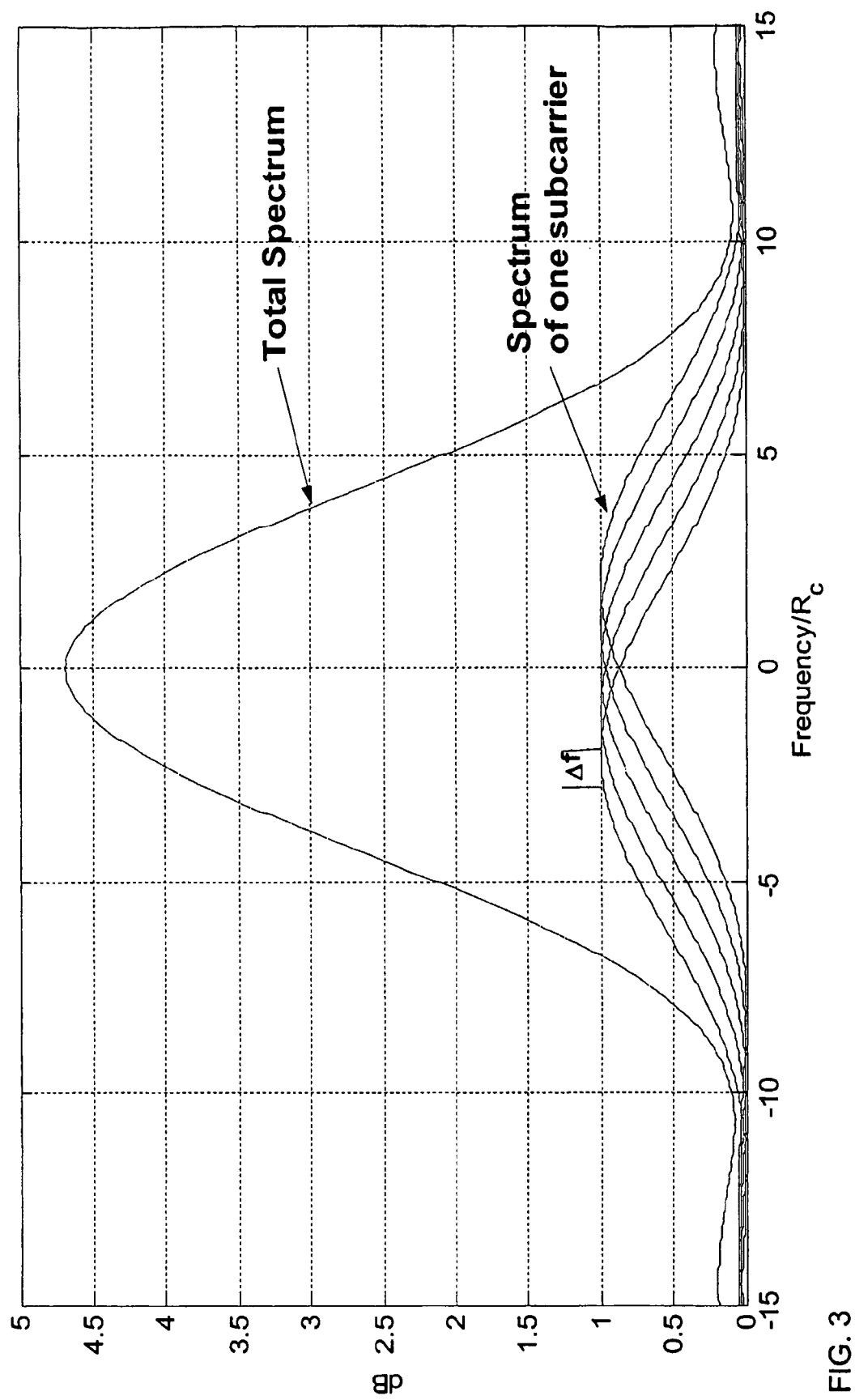
FIG. 3 is a linear scale graph of amplitude in decibels (dB) versus frequency/chip rate ($R_c$) for a spectrum of an exemplary embodiment of MT-DS-CDMA modulation.
Figure 4:
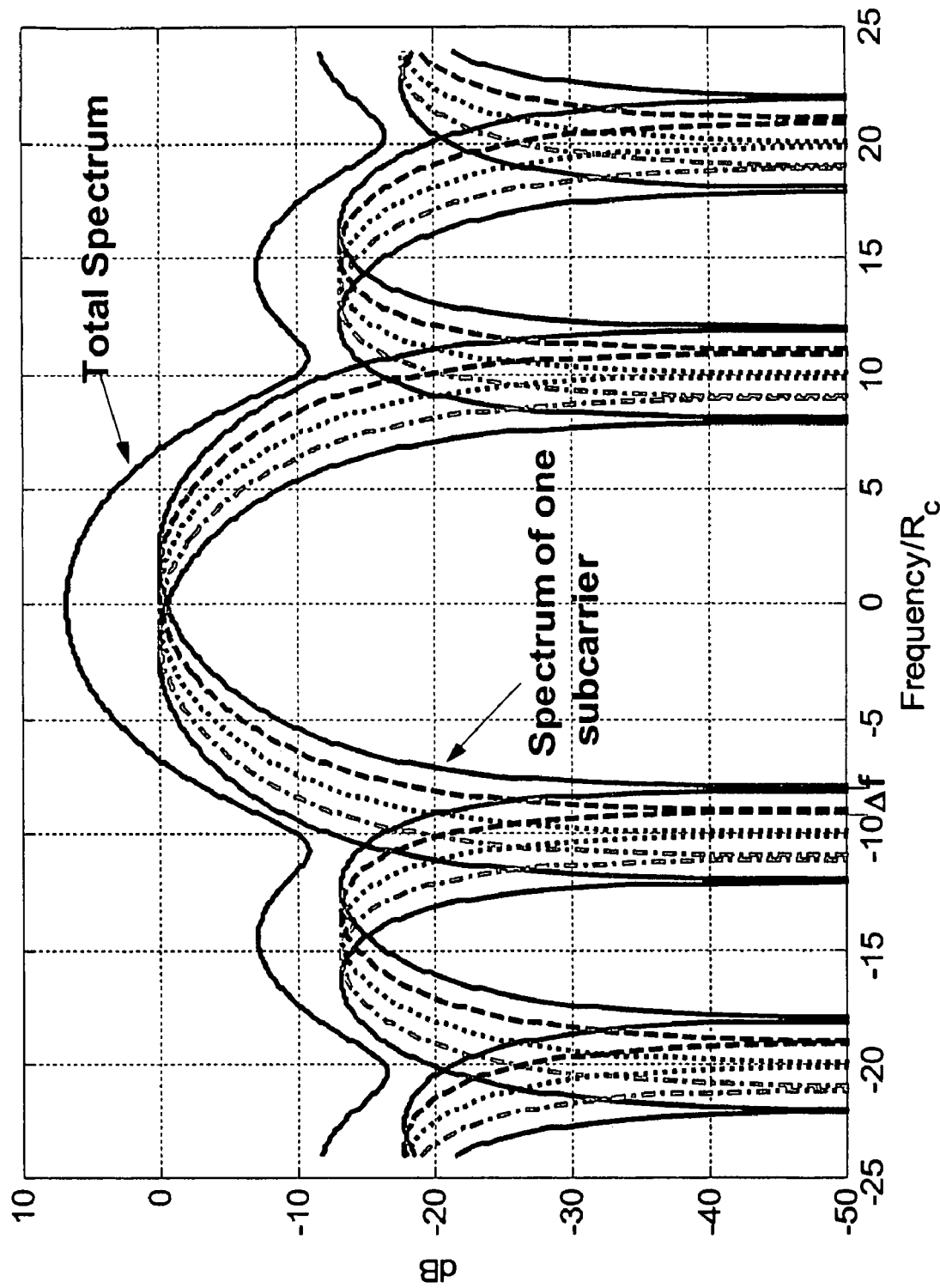
FIG. 4 is a logarithmic scale graph of amplitude in dB versus frequency/$R_c$ for a spectrum of an exemplary embodiment of MT-DS-CDMA modulation.

With reference to FIGS. 3 and 4, spectrum graphs for conventional MT-DS-CDMA are presented where the processing gain vector (N) is 10 and the quantity of subcarriers (M) is 5. FIG. 3 provides a linear scale graph of the spectrum and FIG. 4 provides a logarithmic scale graph. Moreover, FIGS. 3 and 4 show a conventional MT-DS-CDMA, where the mainlobe bandwidth may be represented as $(M-1)\Delta f + 2/T_c$ for M subcarriers and $\Delta f$ is the frequency separation between adjacent subcarriers and equal to the data rate of each subcarrier.

Figure 5:
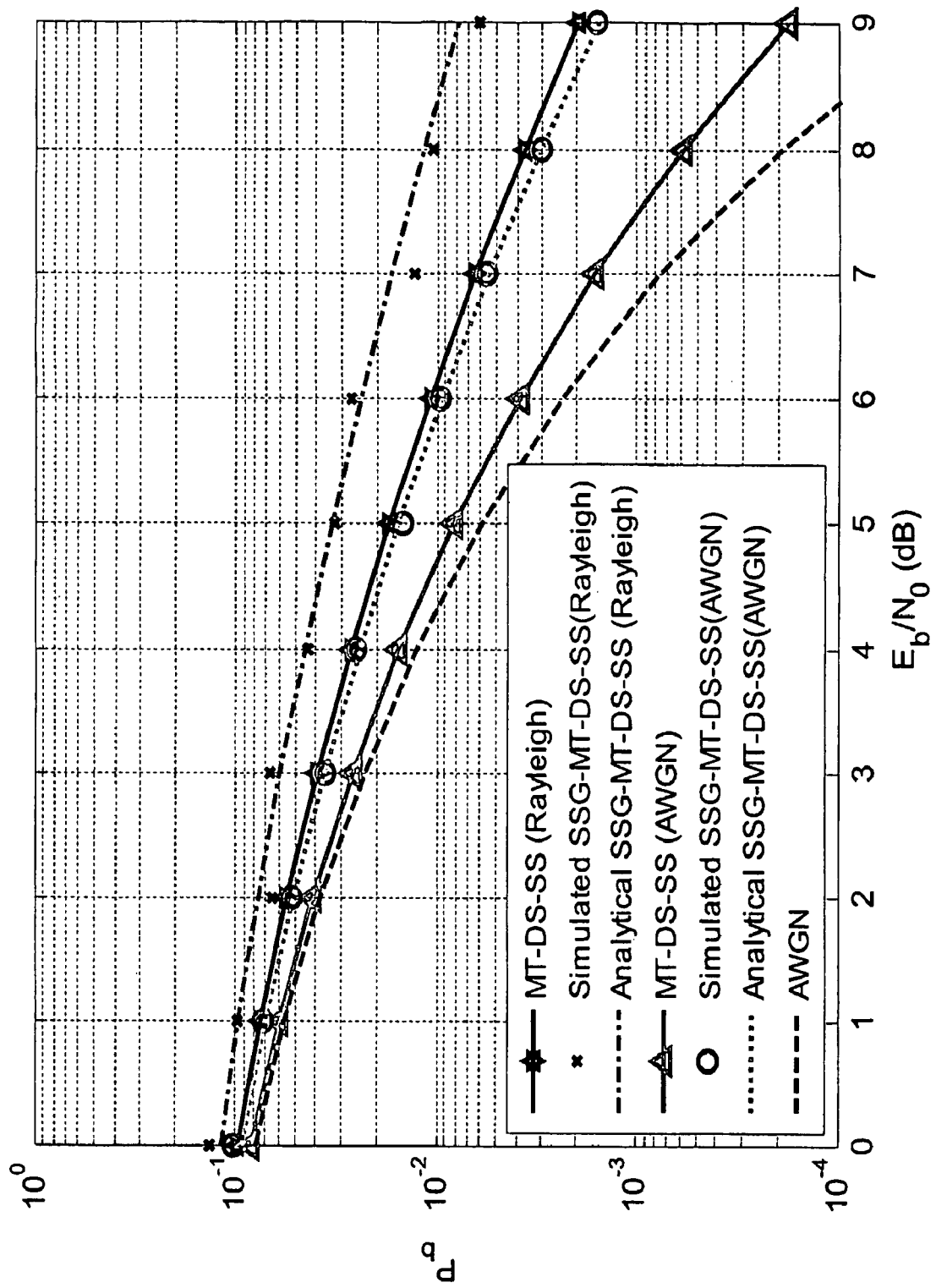
FIG. 5 is a graph of bit error probability ($P_b$) versus energy per bit to noise density ratio ($E_b/N_0$) in dB showing bit error ratio (BER) for an exemplary embodiment of SSG-MT-DS-SS modulation.
Figure 6:
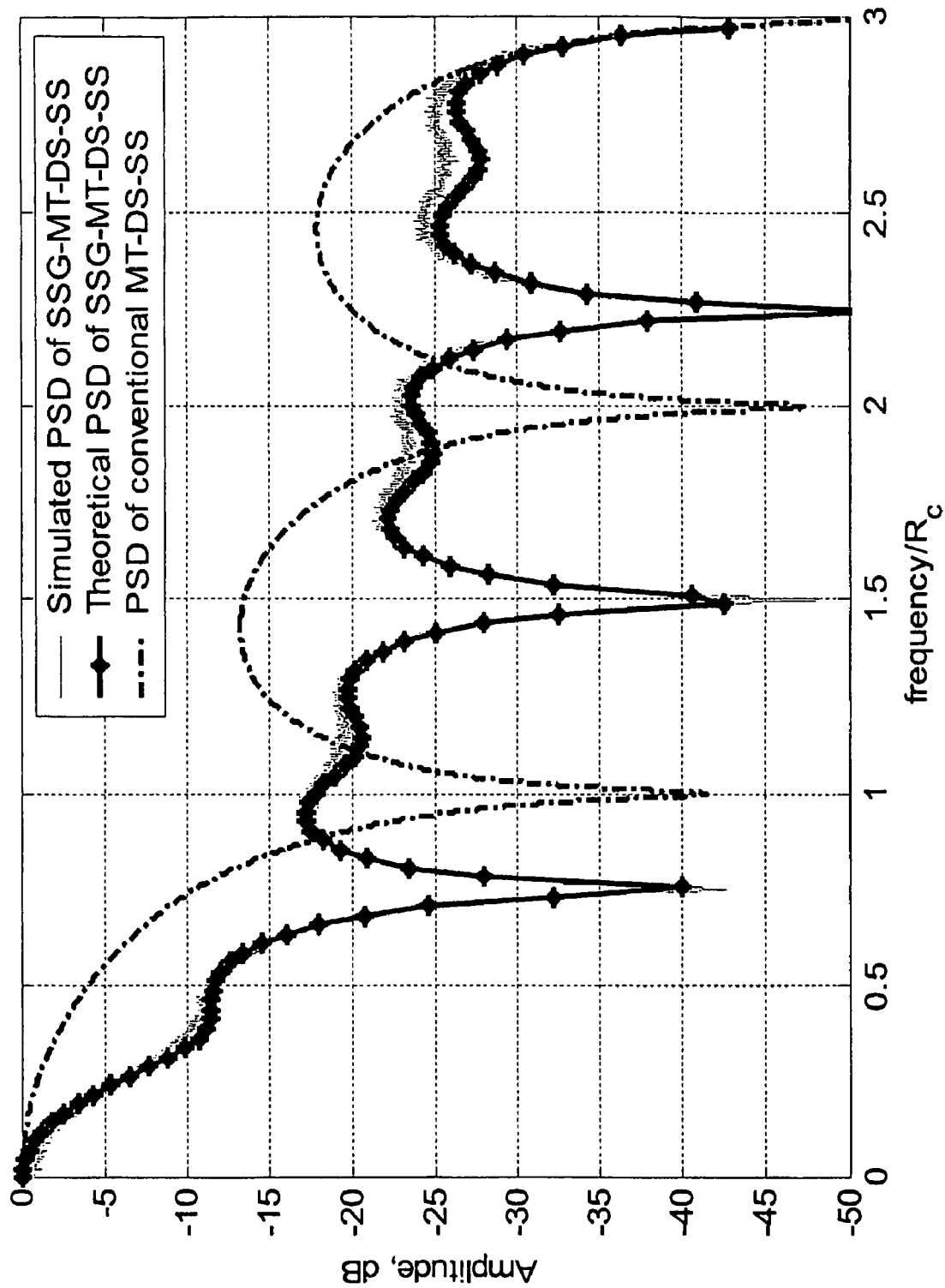
FIG. 6 is a graph of amplitude in dB versus frequency/$R_c$ showing power spectrum density (PSD) for an exemplary embodiment of SSG-MT-DS-SS modulation.
Figure 7:
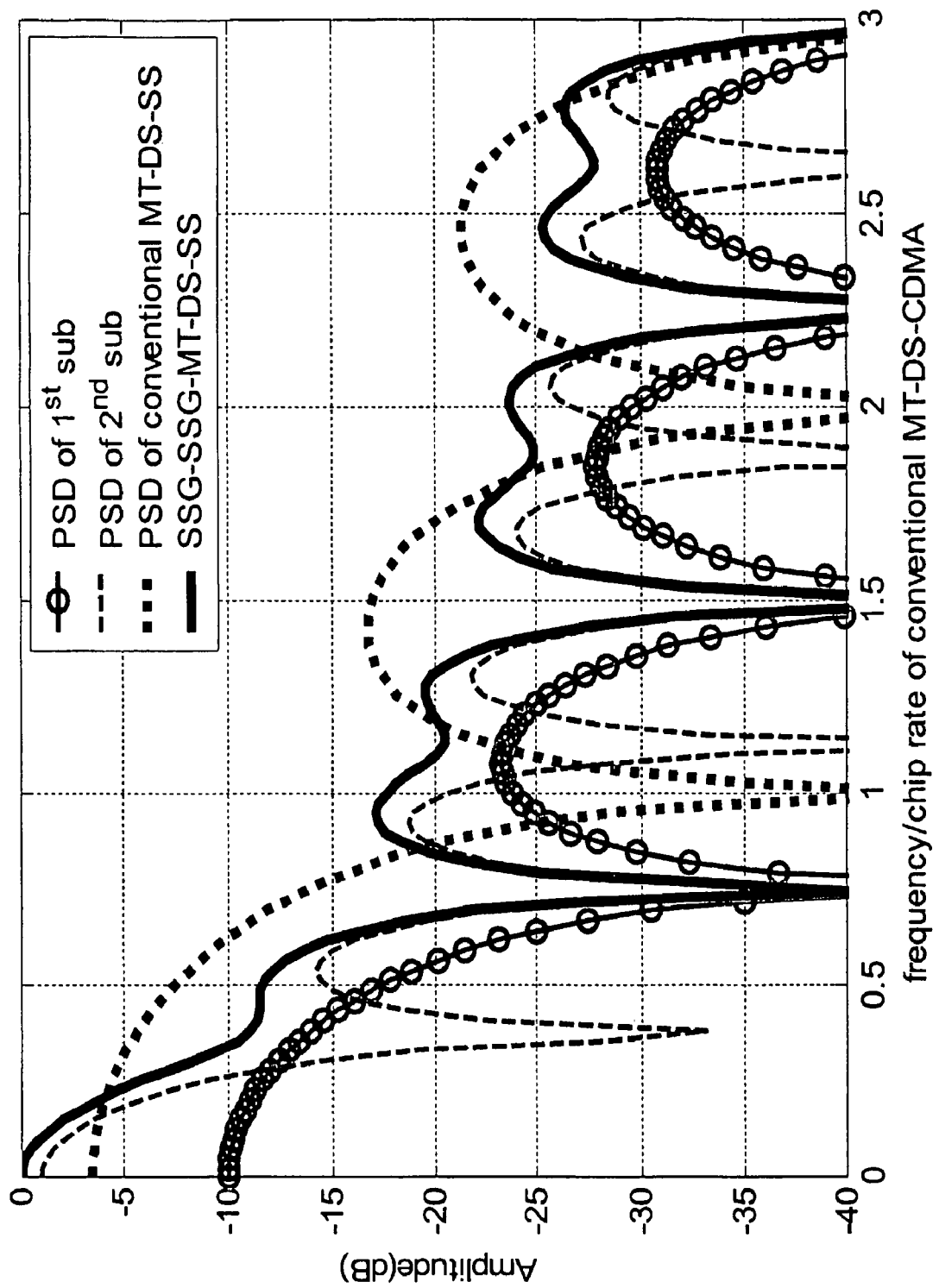
FIG. 7 is a graph of amplitude in dB versus frequency/$R_c$ for a spectrum of an exemplary embodiment of SSG-MT-DS-SS modulation.

With reference to FIGS. 5-7, simulation and analytical results for an M=3 subcarrier case, with $R_{b,s}=[1,2,1]$, $N_s=[1, \frac{1}{4},1]$, $E_{b,s}=[1,2,1]$, and frequency separation $\Delta f_s=[1,1]$ are provided for an exemplary embodiment of SSG-MT-DS-SS modulation in comparison with an embodiment of conventional MT-DS-SS modulation. In FIG. 5, a graph of $P_b$ vs. $E_b/N_0$ (dB) is provided for the SSG-MT-DS-SS and MT-DS-SS embodiments in a BER plot. In FIG. 6, a graph of amplitude in dB vs. frequency/$R_c$ is provided for the SSG-MT-DS-SS and MT-DS-SS embodiments in a PSD plot. In FIG. 7, a graph of amplitude in dB vs. frequency/$R_c$ is provided for the SSG-MT-DS-SS and MT-DS-SS embodiments in a spectrum plot.

Moreover, in FIGS. 5-7, the analysis of an exemplary embodiment of SSG-MT-DS-SS modulation is provided in a BER plot, a PSD graph, and a graph showing component and total spectra. FIG. 6 shows the simulation results for power spectral density and FIG. 5 shows BER performance of single user SSG-MT-DS-SS in both AWGN and a dispersive Nakagami-m fading channel. The M=3 subcarrier SSG-MT-DS-SS has parameters vectors $R_b=[1,2,1]R_{b,1}^s$, with $R_{b,1}^s=3R_b^c/4$, $E_b=[1,2,1]E_{b,1}^s$, with $E_{b,1}^s=2E_b^c/3$, $\Delta f=[1,1]R_{b,1}^s$, and $N=[1,\frac{1}{4},1]N^c$ with $N^c=128$. Note that $R_b^c$ and $E_b^c$ are, respectively, the data rate and bit energy of any subcarrier for a conventional MT-DS-SS system. Thus, given these parameters, the SSG-MT-DS-SS system and the three-subcarrier conventional MT-DS-SS system have the same total data rate, equal to $3R_b^c$, and the same transmit power, equal to $3R_b^c E_b^c$. For the purpose of simplicity of expression, henceforth the data rate vector $R_b$ and frequency separation vector $\Delta f$ is normalized by $R_{b,1}^s$, the data rate of the first subcarrier. Additionally, the bit energy vector $E_b$ is normalized by $E_{b,1}^s$, the bit energy of the first subcarrier; and the processing gain vector N by the processing gain of conventional MT-DS-SS, $N^c$, which is 128 for the example provided herein. Note that the frequency axes for the figures are normalized by $R_c$, the chip rate of the conventional MT-DS-SS.

As seen in FIG. 6, by varying the energy, data rate, and processing gain vectors, both spectral shaping and reduction of the spectral sidelobe peak levels can be obtained. This can be explained by FIG. 7, where the spectra of both conventional and SSG-MT-DS-SS normalized to the peak of the SSG-MT-DS-SS spectrum are shown, and also two of the M=3 individual subcarrier spectra. The mainlobes of all the component subcarriers of the SSG-MT-DS-SS are narrower than those of the conventional scheme. In addition, the power of the SSG-MT-DS-SS central subcarrier (the narrowest subcarrier), is nearly 4 dB higher than that of conventional. Thus, more energy has been concentrated in the SSG-MT-DS-SS main lobe, while only very slightly increasing sidelobe levels, resulting in a relative reduction in sidelobe levels. Henceforth, the PSD of conventional MT-DS-SS and SSG-MT-DS-SS are normalized by their respective maximum values.

The AWGN channel can be viewed as a special case of the dispersive fading channel where the channel may be a single tap channel with unit channel attenuation. The performance degradation of single user SSG-MT-DS-SS may be due to the inter-subcarrier same user interference (IS-SUI). The statistics and example analysis are provided below under the heading "Example IS-SUI Statistics Derivation." The IS-SUI variances for the cases in Table 1 are provided below in Table 2.

TABLE 2

IS-SUI variance for cases in Table 1, single-user, AWGN channel.

| Case | Variance Term in IS-SUI |
|---|---|
| 1. $\lambda_{i,j}=1$, $\mu_{i,j}=1$ | $\psi_{i,i}^2 \left\{ \frac{N_i}{2} + \frac{\sin[4\pi\Delta f_{i,j}T_{c,i}N_i]}{4\sin[2\pi\Delta f_{i,j}T_{c,i}]} \right\}$ |
| 2. $\lambda_{i,j}=1$, $\mu_{i,j}>1$ | $\psi_{i,j}^2 \left\{ \frac{N_j}{2} + \frac{\sin[4\pi\Delta f_{i,j}T_{c,j}N_j]}{4\sin[2\pi\Delta f_{i,j}T_{c,j}]} \right\}$ |
| 3. $\lambda_{i,j}=1$, $\mu_{i,j}<1$ | $\psi_{i,i}^2 \left\{ \frac{N_i}{2} + \frac{\sin[4\pi\Delta f_{i,j}T_{c,i}N_i]}{4\sin[2\pi\Delta f_{i,j}T_{c,i}]} \right\}$ |
| 4. $\lambda_{i,j}<1$, $\mu_{i,j}=1$ | $\frac{1}{\lambda_{i,j}} \psi_{i,j}^2 \left\{ \frac{N_j}{2} + \frac{\sin[4\pi\Delta f_{i,j}T_{c,j}N_j]}{4\sin[2\pi\Delta f_{i,j}T_{c,j}]} \right\}$ |
| 5. $\lambda_{i,j}<1$, $\mu_{i,j}>1$ | $\frac{1}{\lambda_{i,j}} \psi_{i,j}^2 \left\{ \frac{N_j}{2} + \frac{\sin[4\pi\Delta f_{i,j}T_{c,j}N_j]}{4\sin[2\pi\Delta f_{i,j}T_{c,j}]} \right\}$ |
| 6. $\lambda_{i,j}<1$, $\mu_{i,j}<1$ | $\psi_{i,j}^2 \left\{ \frac{N_i}{2} + \frac{\sin[4\pi\Delta f_{i,j}T_{c,i}N_i]}{4\sin[2\pi\Delta f_{i,j}T_{c,i}]} \right\}$ |
| 7. $\lambda_{i,j}>1$, $\mu_{i,j}=1$ | $0\psi_{i,i}^2 \left\{ \frac{N_i}{2} + \frac{\sin[4\pi\Delta f_{i,j}T_{c,i}N_i]}{4\sin[2\pi\Delta f_{i,j}T_{c,i}]} \right\}$ |
| 8. $\lambda_{i,j}>1$, $\mu_{i,j}>1$ | $\psi_{i,j}^2 \left\{ \frac{N_j}{2\lambda_{i,j}} + \frac{\sin[4\pi\Delta f_{i,j}T_{c,j}N_j/\lambda_{i,j}]}{4\sin[2\pi\Delta f_{i,j}T_{c,j}]} \right\}$ |
| 9. $\lambda_{i,j}>1$, $\mu_{i,j}<1$ | $\psi_{i,i}^2 \left\{ \frac{N_i}{2} + \frac{\sin[4\pi\Delta f_{i,j}T_{c,i}N_i]}{4\sin[2\pi\Delta f_{i,j}T_{c,i}]} \right\}$ |

Note:
$\psi_{i,i} = T_{c,i} \sin c(\Delta f_{i,j} T_{c,i}) \sqrt{E_{b,j}/(2T_{b,j})}$
$\psi_{i,j} = T_{c,j} \sin c(\Delta f_{i,j} T_{c,j}) \sqrt{E_{b,j}/(2T_{b,j})}$ For the AWGN case, the IS-SUI may be represented by equation (19) with $L_i^{(k)}=1$. In the AWGN case, FIG. 5 indicates that these particular SSG parameters may require about 1.6 dB more $E_b/N_0$ than conventional MT-DS-SS for $P_b \approx 10^{-3}$.

The dispersive channel for which the BER performance is investigated is a channel with a coherence bandwidth equal to ⅕ of the chip rate of the conventional MT-DS-SS and a decay factor of $\eta=2$ and $m=1$ (Rayleigh). The channel may be a 5-tap channel for conventional MT-DS-SS and the number of taps for SSG-MT-DS-SS may be [4,2,4] for the parameter set of FIGS. 5-7. If the receiver is capable of combining all the resolvable paths, the conventional MT may have 15 RAKE fingers while SSG may have 10. It is clear that SSG-MT-DS-SS may have lower hardware complexity than the conventional scheme. However, because of this about 2 dB may be lost compared with conventional MT-DS-SS in the required $E_b/N_0$ for $P_b \approx 10^{-2}$. Finally, the simulation and analytical results in FIGS. 5-7 show agreement (for both BER and power spectra), corroborating the Gaussian assumption. The agreement between analysis and simulation holds for other values of parameter vectors as well, even for processing gains as low as 30.

The PAPR of a given parameter set can be calculated by equation (30). Table 3 lists some example PAPR reductions for two parameter sets.

TABLE 3

Example PAPR reductions for two different parameter sets.

| $R_b$ | $E_b$ | N | PAPR Reduction $\frac{PAPR^c - PAPR^s}{PAPR^c}$ (%) |
|---|---|---|---|
| [1, 2, 1] | [1, 2, 1] | [1, 1/4, 1] | 11.11 |
| [1, 4, 2, 4, 1] | [1, 2, 1, 2, 1] | [1, 1/4, 1/2, 1/4, 1] | 17.72 |

Figure 8:
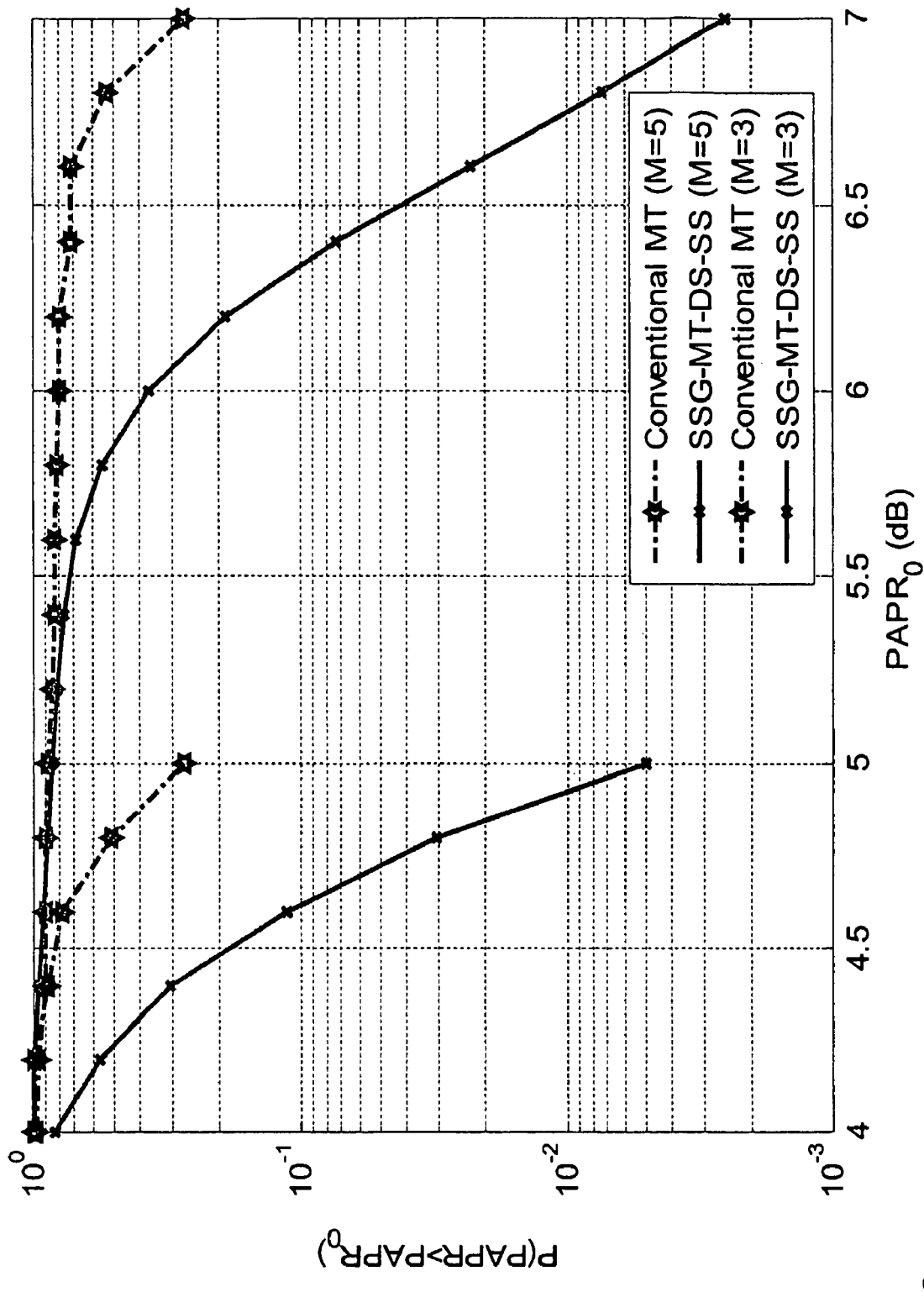
FIG. 8 is a graph of P (PAPR>$PAPR_0$) versus $PAPR_0$ (dB) showing complementary cumulative distribution function (CCDF) for an exemplary embodiment of SSG-MT-DS-SS modulation where, where PAPR is a peak-to-average power ratio.

With reference to FIG. 8, a graph showing complementary cumulative distribution function (CCDF) in an exemplary embodiment of SSG-MT-DS-SS modulation and an embodiment of MT-DS-SS modulation is provided for M=3 and M=5 cases. As indicated above, SSG-MT-DS-SS generally has a lower value of maximum PAPR than conventional MT-DS-SS. In practice, the CCDF is often used to measure the PAPR of a given modulation scheme. In FIG. 8, simulation results show that the SSG-MT-DS-SS schemes with parameters listed in Table 3 have smaller PAPRs than conventional MT systems, i.e., the SSG-MT-DS-SS Pr(PAPR>PAPR$_0$) is less than that of conventional MT-DS-SS for any value of PAPR$_0$.

Figure 9:
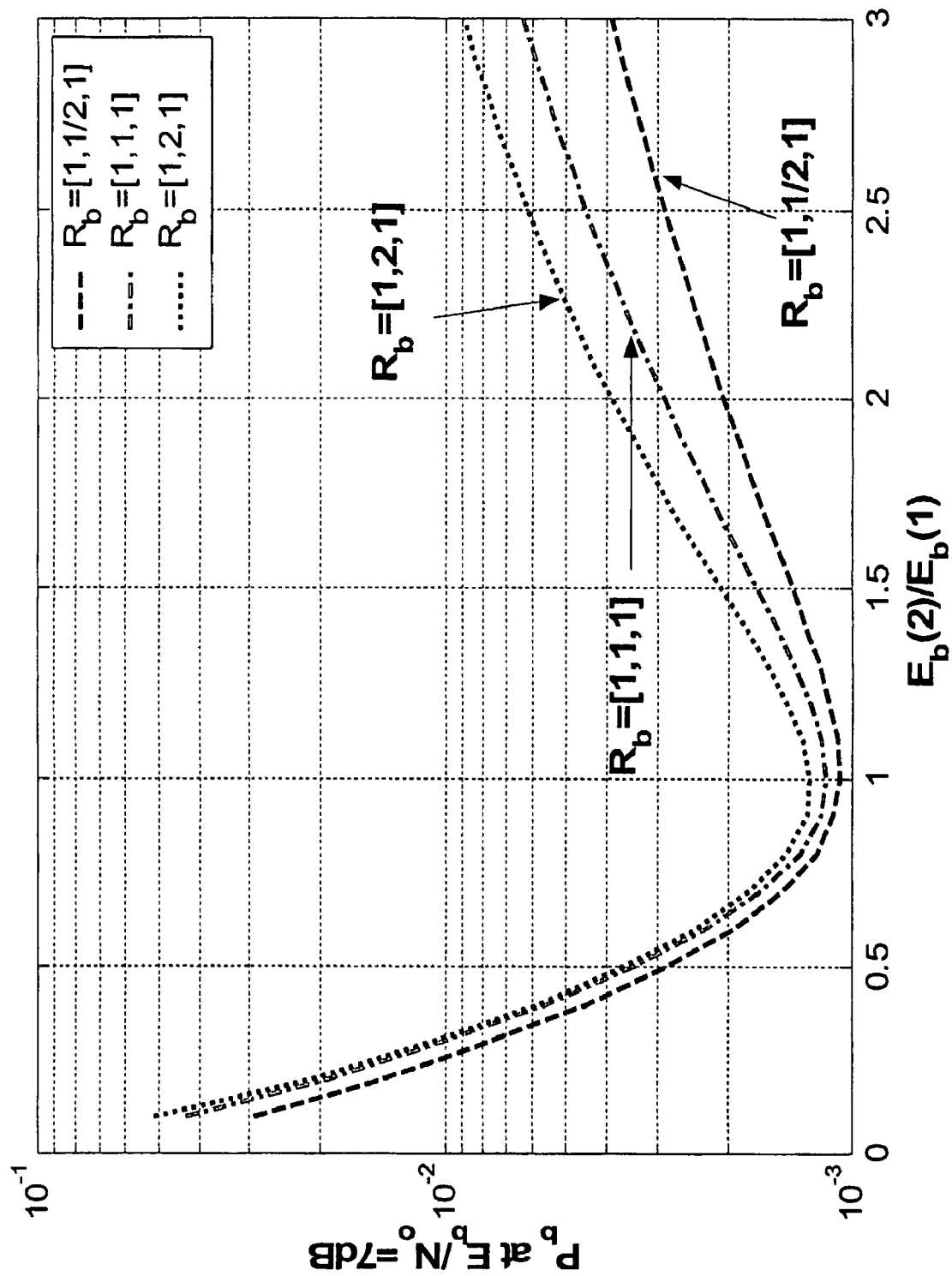
FIG. 9 is a graph of $P_b$ versus the ratio of a bit energy vector to another bit energy vector ($E_b/E_b$) showing an exemplary embodiment of SSG-MT-DS-SS modulation where a data rate vector ($R_b$) is varied.
Figure 10:
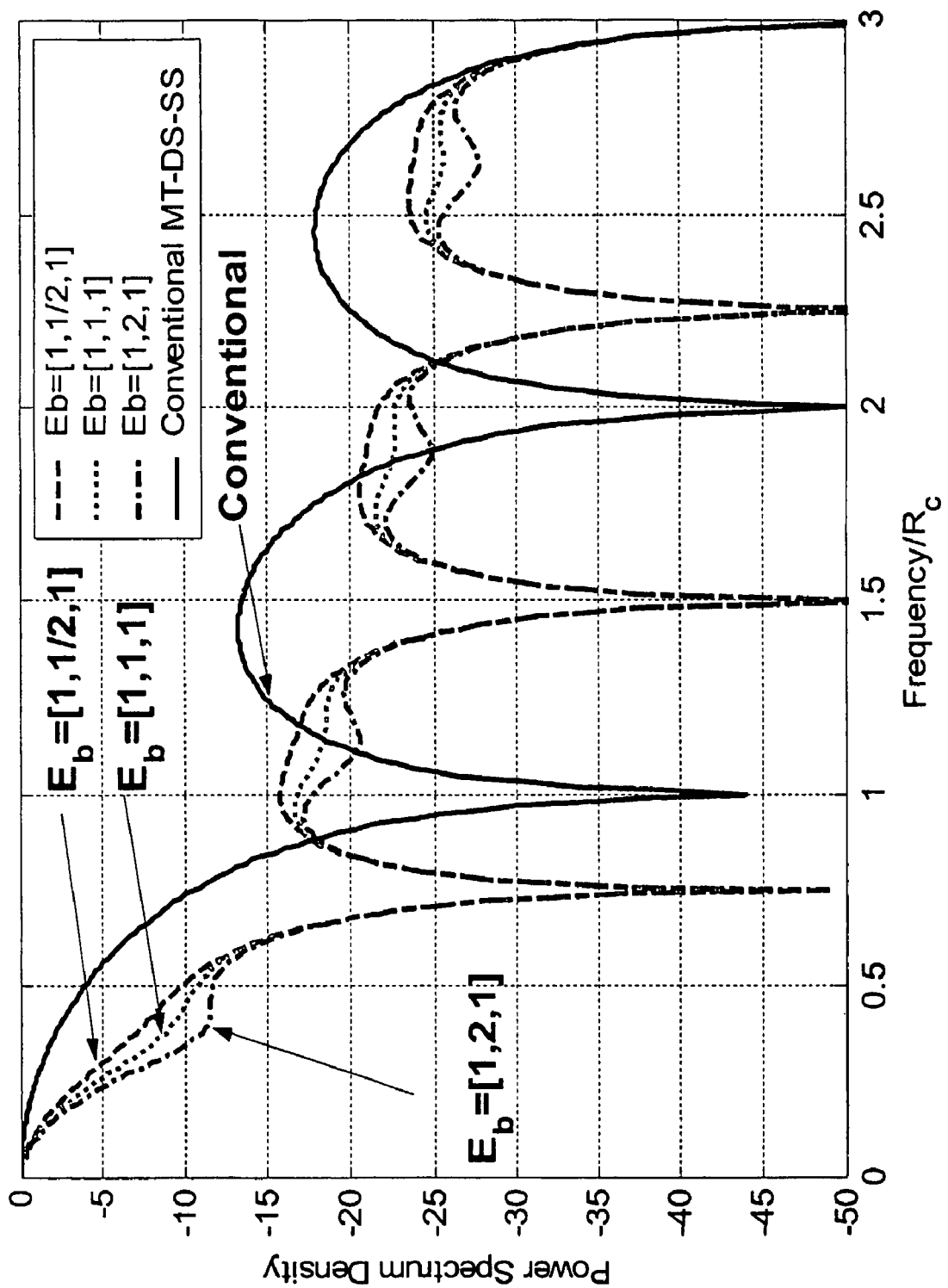
FIG. 10 is a graph of PSD versus frequency/$R_c$ showing an exemplary embodiment of SSG-MT-DS-SS modulation where a bit enter vector ($E_b$) is varied.

With reference to FIGS. 9 and 10, the effect of bit energy distribution on $P_b$ and PSD in an exemplary embodiment of SSG-MT-DS-SS modulation with M=3, $N_s$=[1,¼,1], Δf=[1,1], and $R_c$ the chip rate of conventional MT-DS-SS. In FIG. 9, a graph shows $P_b$ vs. $E_{b2}/E_{b1}$ at $E_b/N_0$=7 dB ($E_b$ is "average" $E_b$=$P_T$/(MR$_{bT}$) with $P_T$=total transmit power, $R_{bT}$=total bit rate), and AWGN channel for the SSG-MT-DS-SS embodiment. In FIG. 10, a graph of PSD for $R_b$=[1,2,1] with different $E_b$ is provided for the SSG-MT-DS-SS embodiment for comparison to a conventional MT-DS-SS embodiment.

In order to further compare the performance of SSG-MT-DS-SS with conventional MT-DS-SS, and also to gain insight into the effects of a given parameter vector, one parameter vector at a time can be varied to show additional results. FIGS. 9 and 10 show the effect of varying the bit energy vector on the AWGN $P_b$ performance and the spectrum for an M=3 subcarrier case. In this example, the first and third subcarriers have the same bit energy ($E_{b1}$=$E_{b3}$) and the ratio between the bit energies of the first and second subcarriers is varied. From FIG. 9, the best $P_b$ performance for SSG-MT-DS-SS is reached when $E_b$=[1,1,1] (same as conventional) and the bit energy distribution does not affect the mainlobe bandwidth, but does affect the sidelobe peak levels and the shape of the transmitted spectrum. This has been found to hold for arbitrary parameter values and arbitrary M. Therefore, in SSG-MT-DS-SS systems, the bit energies may be set equal on subcarriers to obtain the better BER performance.

Figure 11:
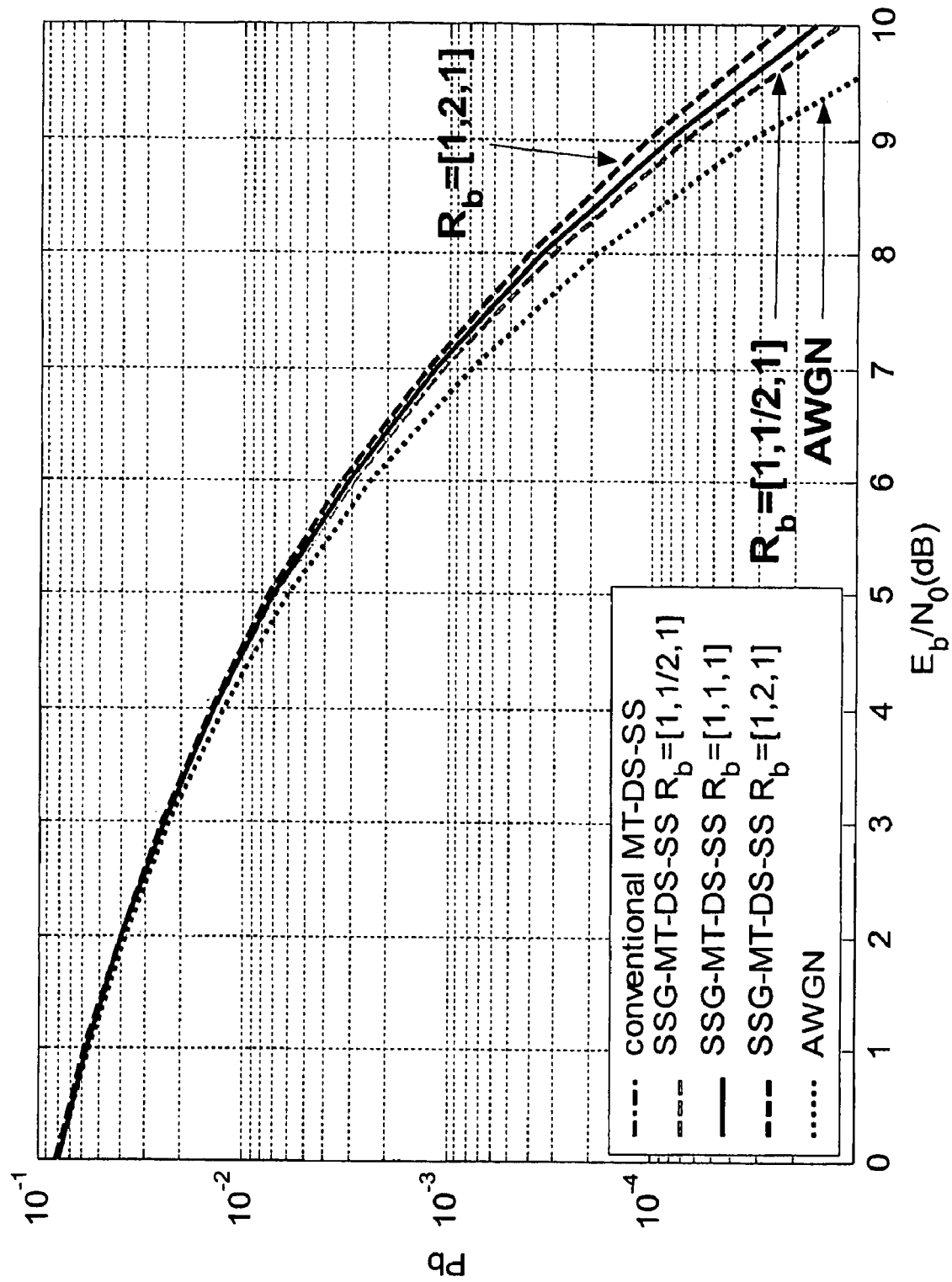
FIG. 11 is a graph of $P_b$ versus $E_b/N_0$ in dB showing another exemplary embodiment of SSG-MT-DS-SS modulation where $R_b$ is varied.
Figure 12:
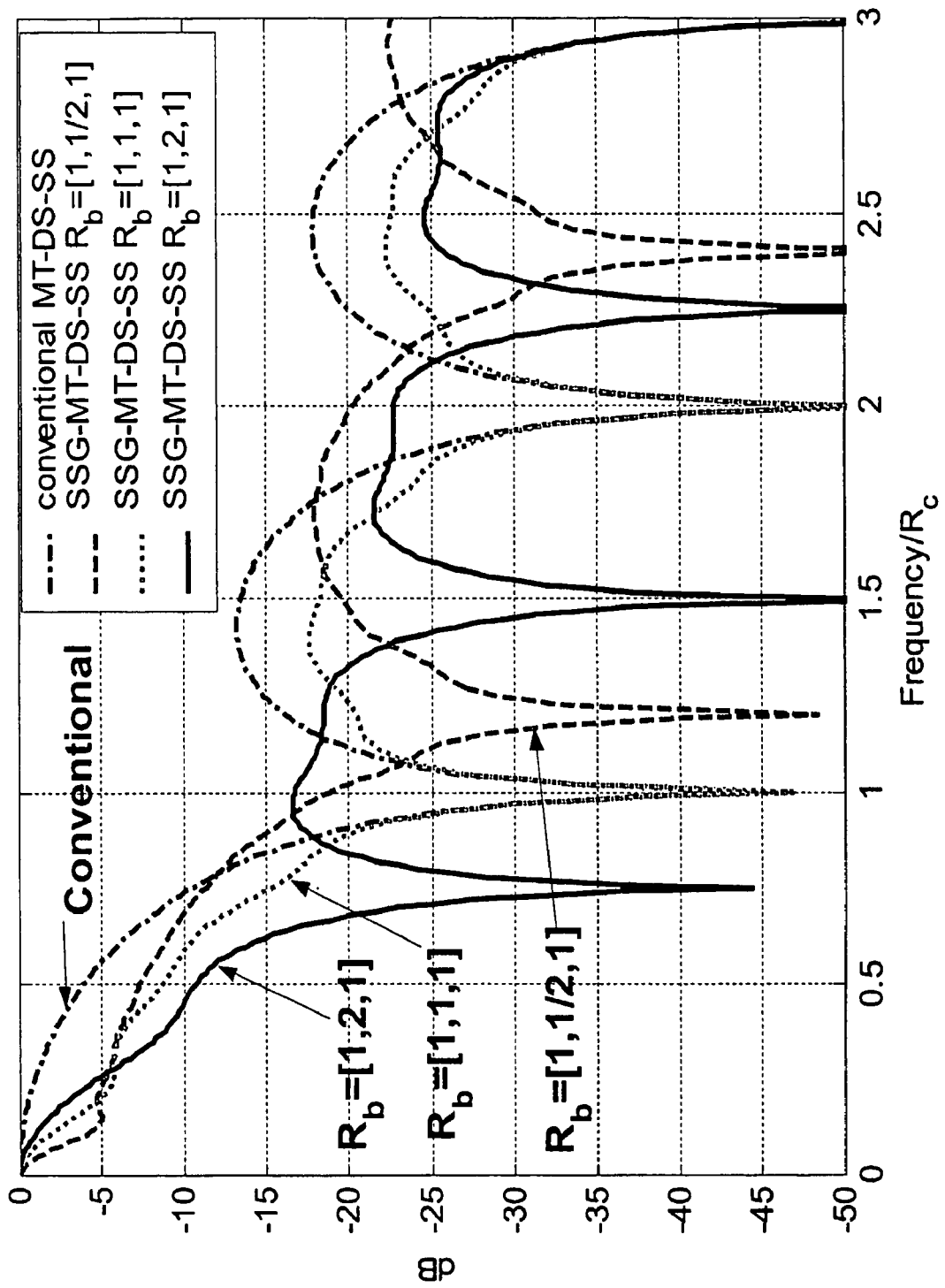
FIG. 12 is a graph of amplitude in dB versus frequency/$R_c$ showing another exemplary embodiment of SSG-MT-DS-SS modulation where $R_b$ is varied.
Figure 13:
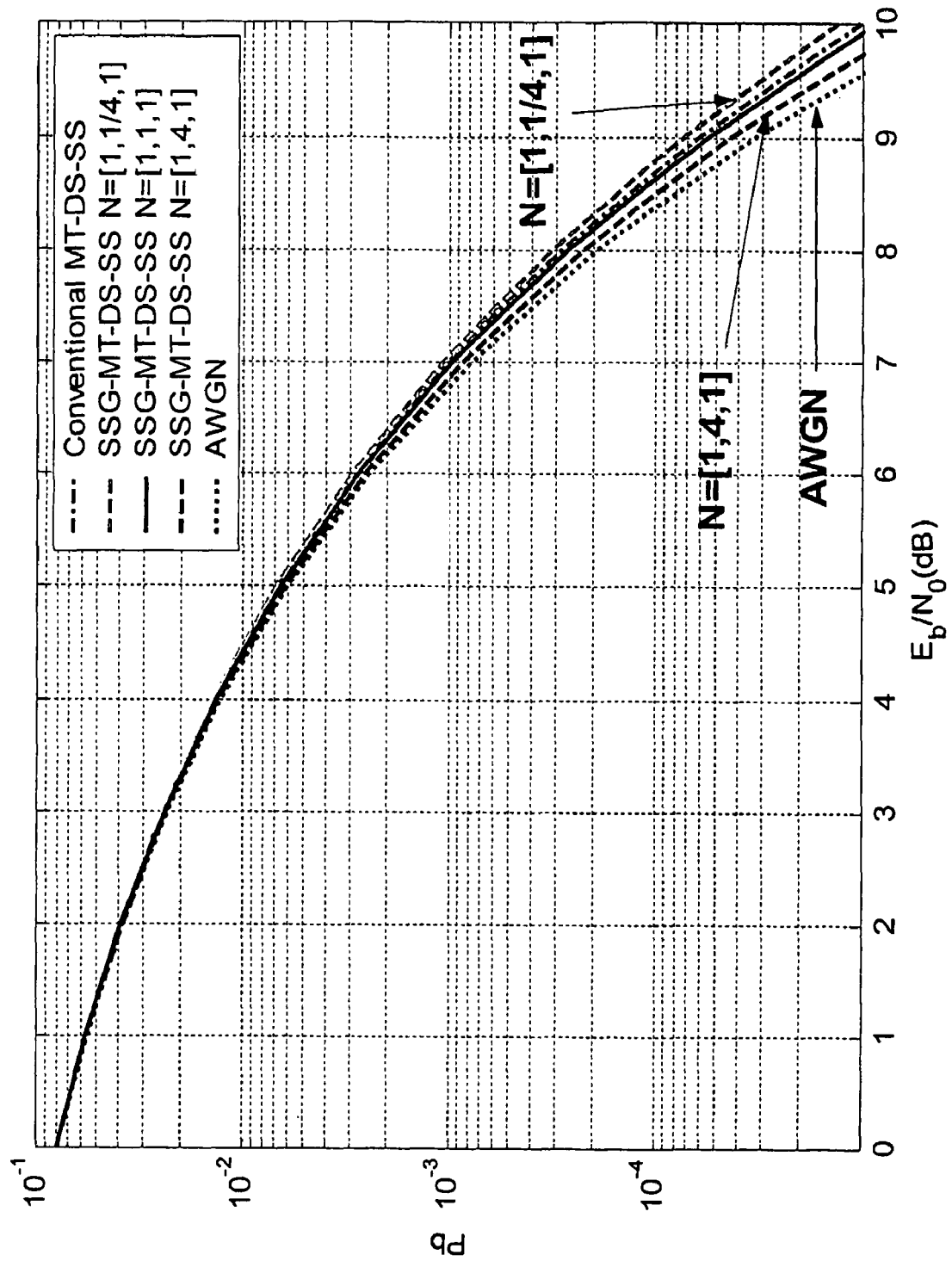
FIG. 13 is a graph of $P_b$ versus $E_b/N_0$ in dB showing an exemplary embodiment of SSG-MT-DS-SS modulation where a processing gain vector (N) is varied.
Figure 14:
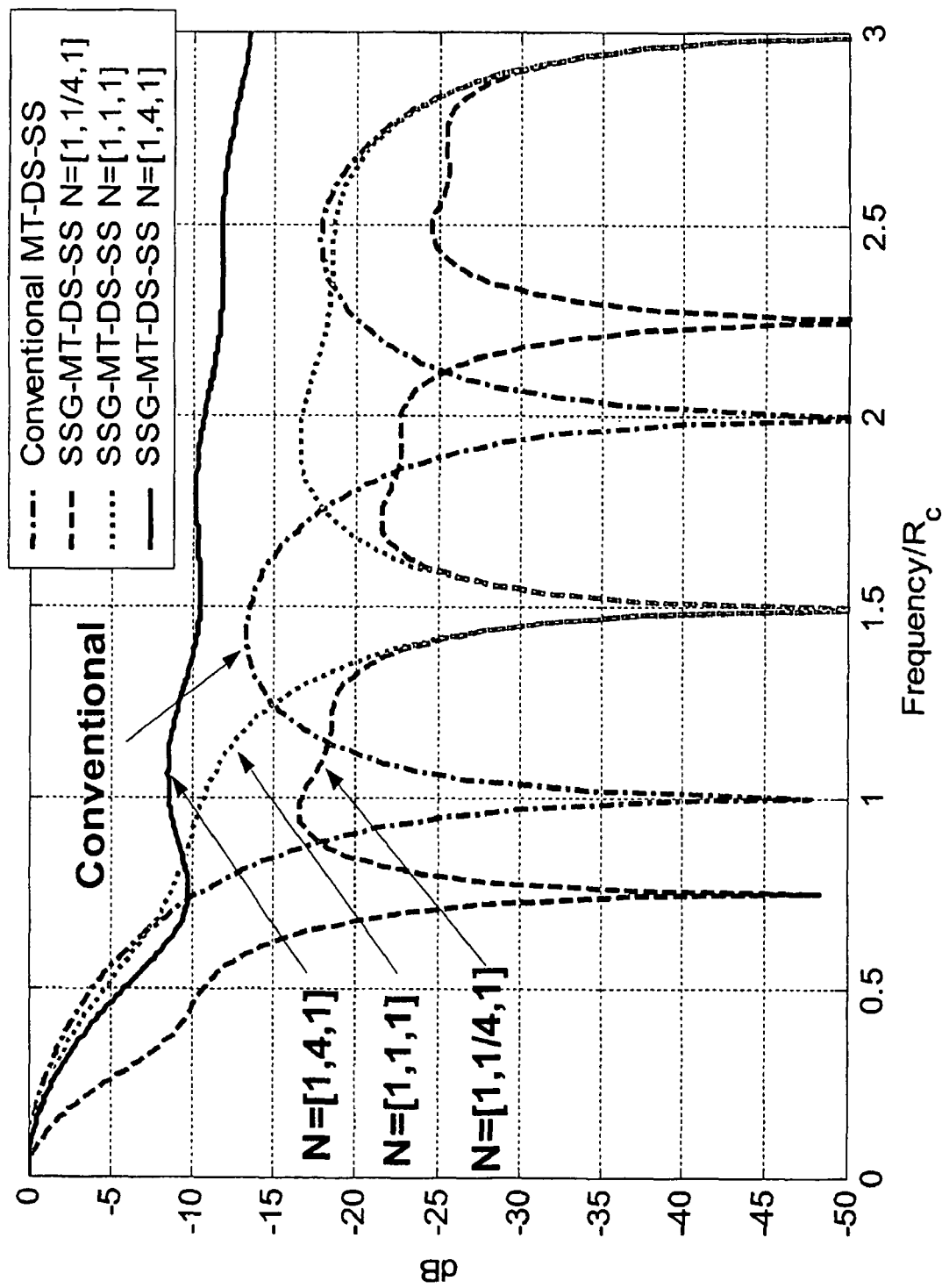
FIG. 14 is a graph of amplitude in dB versus frequency/$R_c$ showing an exemplary embodiment of SSG-MT-DS-SS modulation where N is varied.

With reference to FIGS. 11 and 12, the effect of data rate ratio on $P_b$ and PSD in an exemplary embodiment of SSG-MT-DS-SS modulation with $E_{b,s}$=[1,1,1] $N_s$=[1,¼,1], and Δf$_s$=[1,1] is provided for comparison with an embodiment of MT-DS-SS modulation In FIG. 11, an AWGN channel graph shows $P_b$ vs. $E_b/N_0$ for different data rates in the SSG-MT-DS-SS embodiment for comparison to the MT-DS-SS embodiment. In FIG. 12, a PSD graph shows different $R_b$ in the SSG-MT-DS-SS embodiment for comparison to the MT-DS-SS embodiment. With reference to FIGS. 13 and 14, the effect of processing gain on $P_b$ and PSD in an exemplary embodiment of SSG-MT-DS-SS modulation with $R_{b,s}$=[1,2,1], $E_{b,s}$=[1,1,1], and Δf=[1,1] is provided for comparison to an embodiment of MT-DS-SS modulation. In FIG. 13, an AWGN graph shows $P_b$ vs. $E_b/N_0$ for different processing gains in the SSG-MT-DS-SS embodiment for comparison to the MT-DS-SS embodiment. In FIG. 14, a PSD graph shows different N values in the SSG-MT-DS-SS embodiment for comparison to the MT-DS-SS embodiment.

The design goals for the SSG-MT-DS-SS scheme include lower spectral sidelobes and BER performance comparable to that of conventional MT-DS-SS. In order to achieve these goals, more energy may be concentrated in the spectral mainlobe. One way to achieve this may be to choose parameter sets such that the lower chip rate subcarriers near the power spectrum center frequency have higher chip energy. In FIGS. 11-14, the effect of different data rates and processing gains on BER performance in AWGN and the PSD of SSG-MT-DS-SS are demonstrated. For FIGS. 11-14, the AWGN channel is used for clarity.

From FIGS. 11-14, it can be observed that for data rate vectors $R_b$ and processing gain vectors N within a factor of four of the conventional values, there is little effect on the system's BER performance given the same bit energy on each subcarrier. In fact, for the $R_b$=[1,1,1] case in FIG. 11, the BER curves of the SSG-MT-DS-SS and the conventional system overlap. However, these two vectors ($E_b$ and $R_b$) can greatly affect the transmitted signal's power spectrum. FIGS. 11 and 12 show that the mainlobe bandwidth of the transmitted signal decreases as the data rate of the central subcarrier is increased. This is because as the data rate of the central subcarrier is increased, the data rate and chip rate of the non-central subcarriers is decreased to keep the same total data rate as conventional MT-DS-SS. Processing gain N, for example, is held constant in FIGS. 11 and 12. Reducing the data rate and chip rate of the non-central subcarriers decreases the bandwidth of these non-central subcarriers and that of the total transmitted signal as well. From FIGS. 13 and 14, it can be seen that decreasing the processing gain of the central subcarrier will decrease the mainlobe bandwidth of the transmitted signal with little performance degradation.

Figure 15:
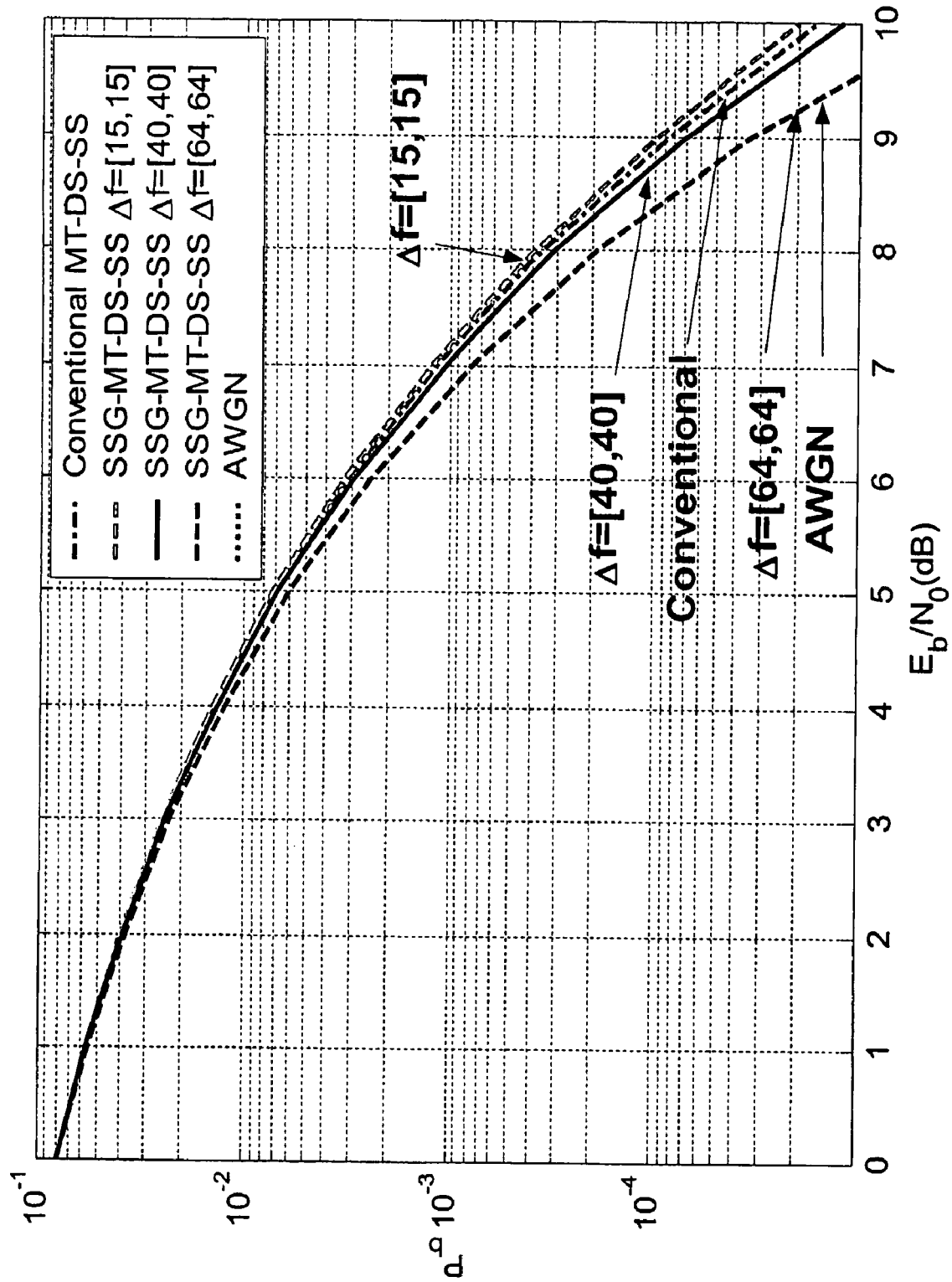
FIG. 15 is a graph of $P_b$ versus $E_b/N_0$ in dB showing an exemplary embodiment of SSG-MT-DS-SS modulation where a frequency separation vector ($\Delta f$) is varied.
Figure 16:
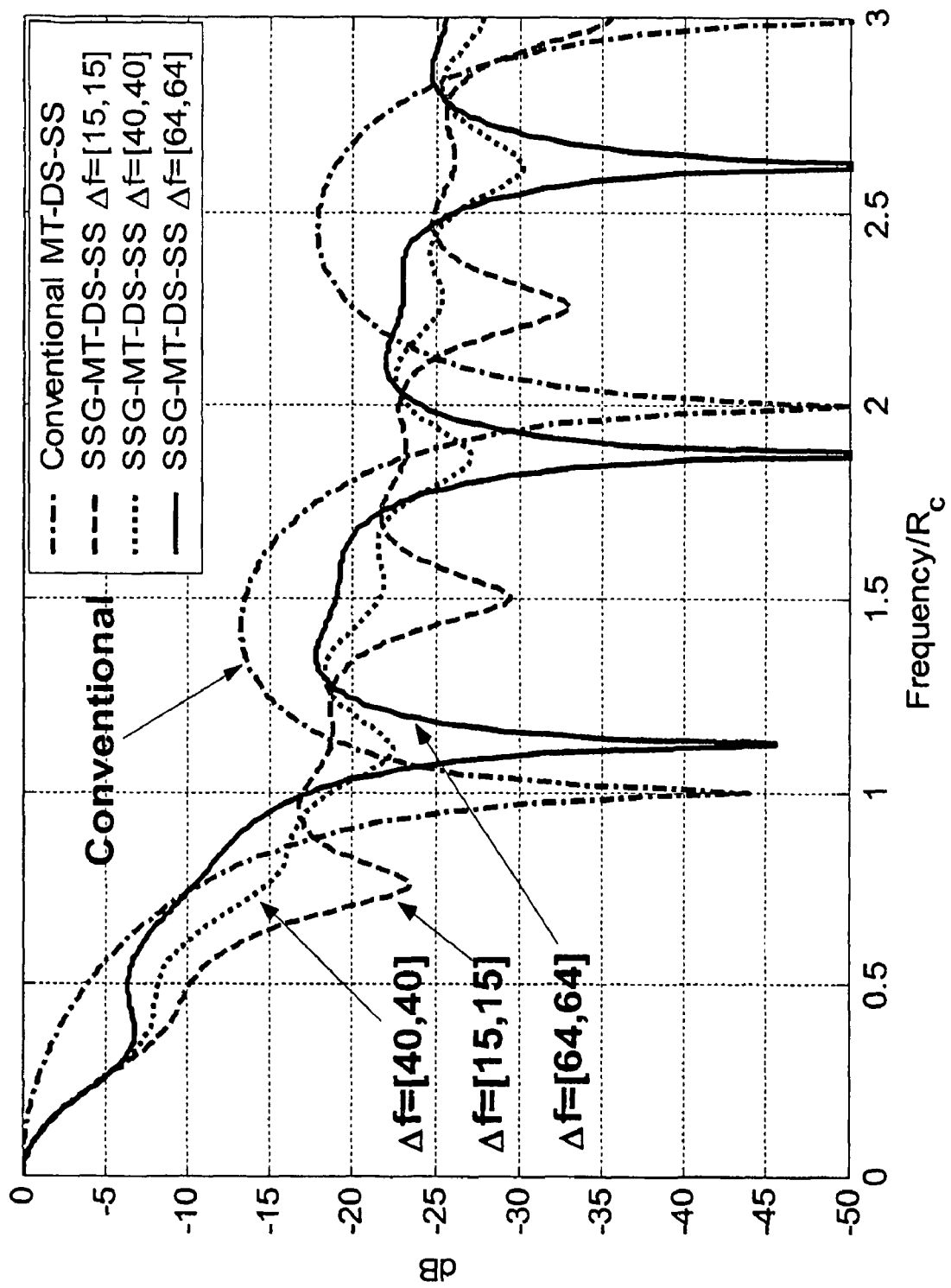
FIG. 16 is a graph of amplitude in dB versus frequency/$R_c$ showing an exemplary embodiment of SSG-MT-DS-SS modulation where $\Delta f$ is varied.

With reference to FIGS. 15 and 16, the effect of different frequency separations between each subcarrier on PSD in an exemplary embodiment of SSG-MT-DS-SS modulation with $R_{b,s}$=[1,2,1], $E_{b,s}$=[1,1,1], and $N_s$=[1,¼,1] is provided for comparison with an embodiment of MT-DS-SS modulation. In FIG. 15, an AWGN graph shows $P_b$ vs. $E_b/N_0$ for different frequency separations in the SSG-MT-DS-SS embodiment for comparison to the MT-DS-SS embodiment. In FIG. 16, a PSD graph shows different Δf in the SSG-MT-DS-SS embodiment for comparison to the MT-DS-SS embodiment.

FIGS. 15 and 16 show the BER (AWGN) plot and PSD for different frequency separations. From FIGS. 15 and 16, it can be observed that the SSG-MT-DS-SS outperforms conventional MT-DS-SS (with different codes on the subcarriers) when the frequency separation of the system is Δf=40 $R_{b,1}^s$ (i.e., actually greater than Δf=27 $R_{b,1}^s$=(27/128)$R_{c,1}^s$). Moreover, the same BER performance as AWGN is provided when Δf=64 $R_{b,1}^s$=0.5 $R_{c,1}^s$. This indicates that each subcarrier is orthogonal to all others at this frequency separation, and the SSG-MT-DS-SS system is IS-SUI free. The frequency separation conditions for which the SSG-MT-DS-SS system obtains orthogonal subcarriers are described below under the heading "Orthogonal Subcarrier Signals by Appropriate Selection of Δf$_{i,j}$." Note from FIGS. 15 and 16 that, in this case, the mainlobe bandwidth of SSG-MT-DS-SS is slightly larger than in the conventional case, but the sidelobe reduction is still obtained, and the SSG PAPR is still lower than conventional. If BER performance is the main concern in system design, a frequency separation can be chosen that makes the performance of SSG-MT-DS-SS the same as orthogonal subcarrier performance. Note again that, for conventional MT-DS-SS, different (distinct) random codes on the subcarriers are used, whereas in conventional systems identical codes were used. The use of identical codes and frequency spacing of $R_s$ or $R_s/2$ may provide inter-subcarrier orthogonality, and hence orthogonal subcarrier performance on the AWGN channel. The use of distinct codes is advantageous from a security perspective, as previously noted.

Having shown results for M=3 subcarriers, the next examples show results using a larger number of subcarriers to shape the spectrum. The advantage of increasing the number of subcarriers in a constant bandwidth system is that the processing gain of each subcarrier can be increased and thus improve the BER performance. Increasing the number of subcarriers of SSG-MT-DS-SS allows one to choose the parameters of each subcarrier from a larger set, thus giving us more "degrees of freedom" to shape the spectrum.

Figure 17:
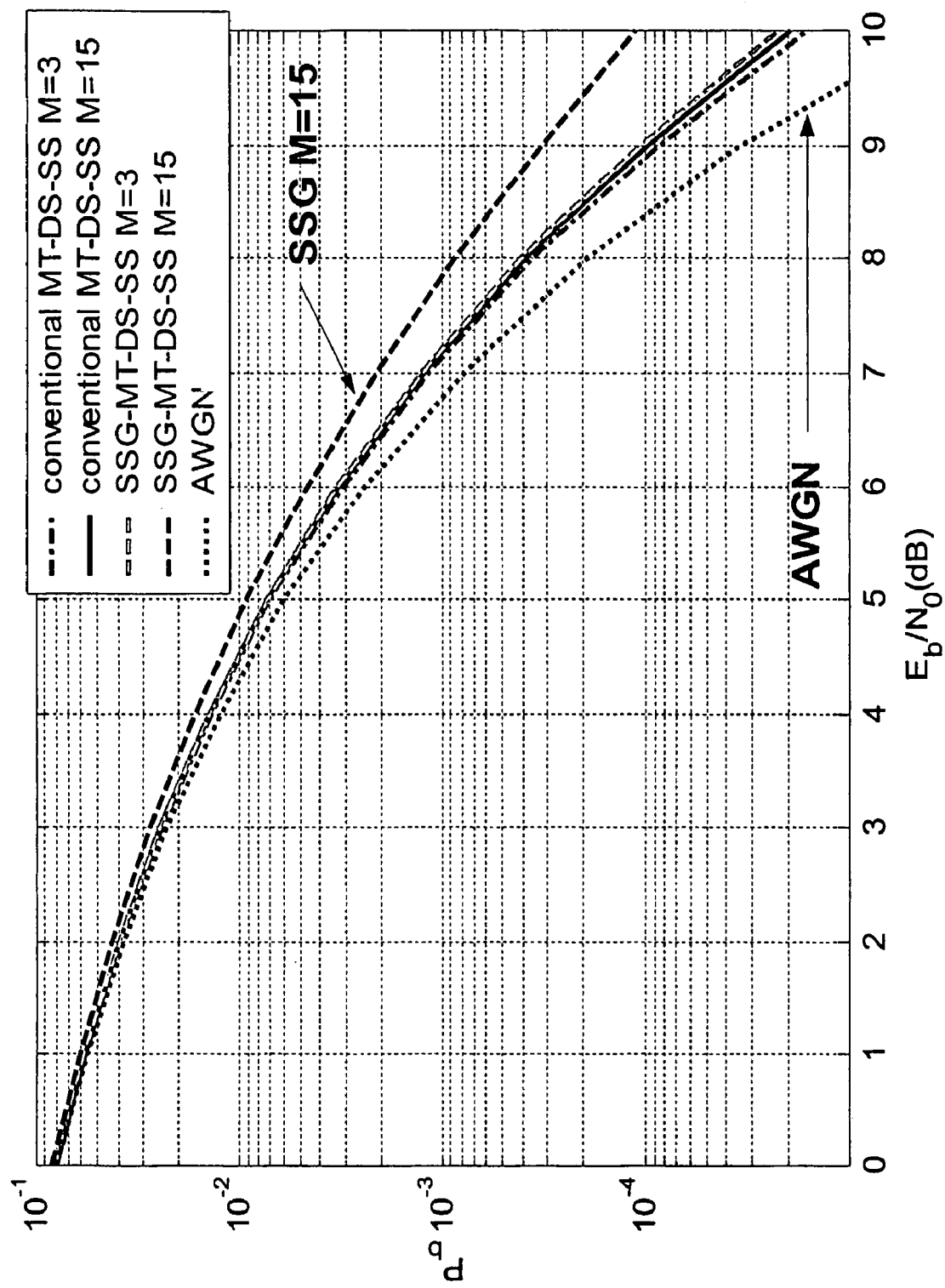
FIG. 17 is a graph of $P_b$ versus $E_b/N_0$ in dB showing exemplary embodiments of SSG-MT-DS-SS modulation with different quantities of subcarriers where $R_b$ and N are varied.
Figure 18:
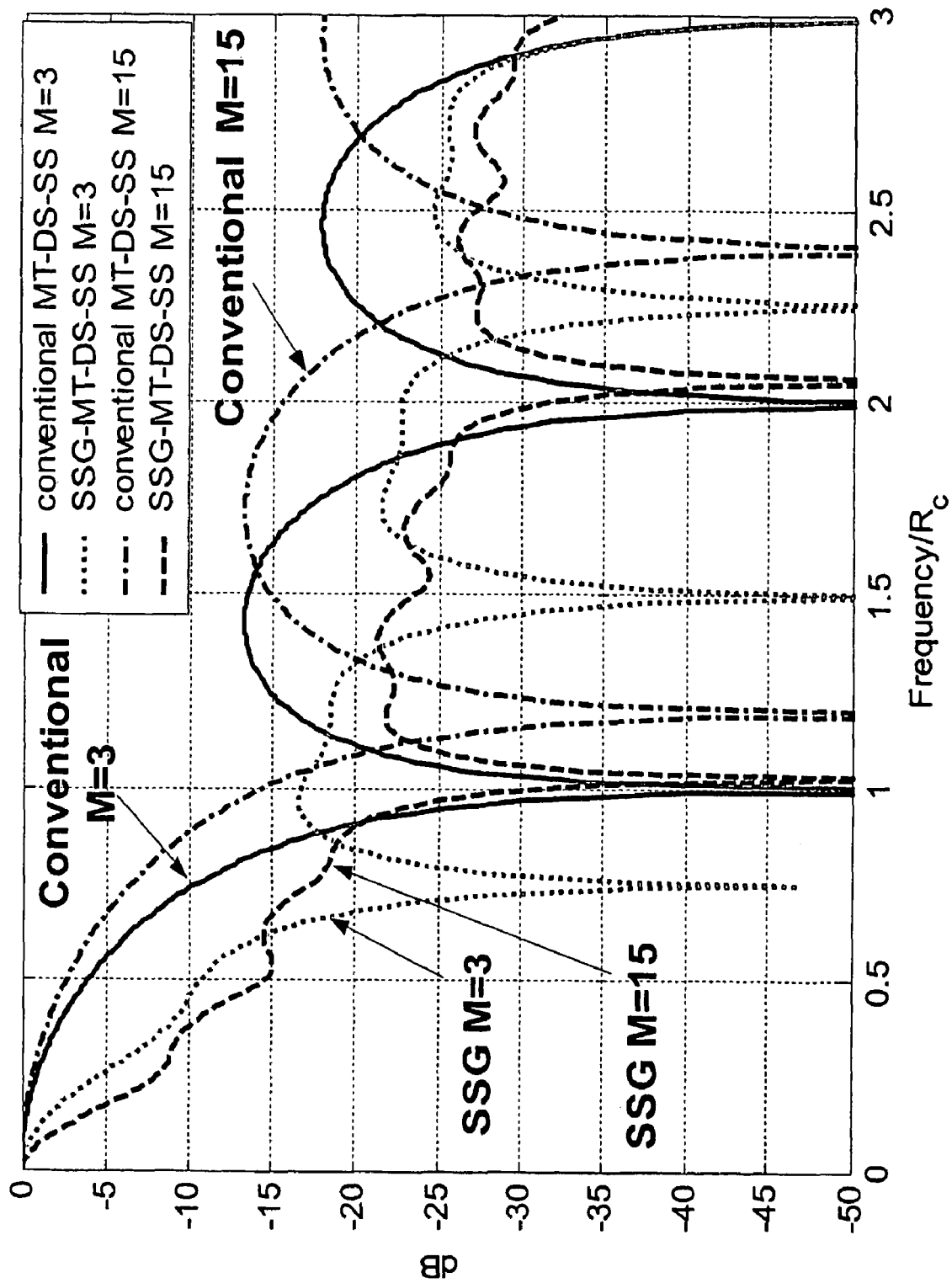
FIG. 18 is a graph of amplitude (dB) versus frequency/$R_c$ showing exemplary embodiments of SSG-MT-DS-SS modulation with different quantities of subcarriers where $R_b$ and N are varied.

With reference to FIGS. 17 and 18, $P_b$ vs. $E_b/N_0$ and PSD graphs for an exemplary embodiment of SSG-MT-DS-SS modulation with different numbers of subcarriers, with $N_1^c=128$, $N_2^c=6N_1^c$; M=3 subcarriers has $R_b=[1,2,1]$, $E_b=[1,1,1]$, $N_s=[1,¼,1] N_1^c$; $\Delta f=[1,1]$; M=15 subcarriers has $R_b=[1,2,2,2,4,2,4,1,4,2,4,2,2,2,1]$, $E_b=[1_{1\times15}]$ $N_s=[1, ¼, ¼, ¼, ¼, ¼, ½, ¼, ¼, ¼, ½, ¼, ¼, ¼, 1]N_2^c$, and $\Delta f=[1_{1\times14}]$ is provided for comparison with an embodiment of MT-DS-SS modulation. In FIG. 17, an AWGN graph shows $P_b$ vs. $E_b/N_0$ for different numbers of subcarriers in the SSG-MT-DS-SS embodiment for comparison to the MT-DS-SS embodiment. In FIG. 18, a PSD graph shows different numbers of subcarriers in the SSG-MT-DS-SS embodiment for comparison to the MT-DS-SS embodiment. Moreover, FIGS. 17 and 18 show the BER and PSD of the SSG-MT-DS-SS system with M=3 and 15 subcarriers. From FIGS. 17 and 18, one can see that if the total data rate is kept the same, increasing the number of subcarriers and the processing gain of each subcarrier at the same time increases the mainlobe bandwidth of conventional MT-DS-SS. In contrast, with an M=15, SSG-MT-DS-SS system, the M=15 SSG-MT-DS-SS system can be made to have approximately the same mainlobe bandwidth as the M=3 conventional system and sidelobe levels can be further reduced. The SSG-MT-DS-SS required $E_b/N_0$ for $P_b=10^{-3}$ is within 1 dB of that of the conventional scheme.

Figure 19:
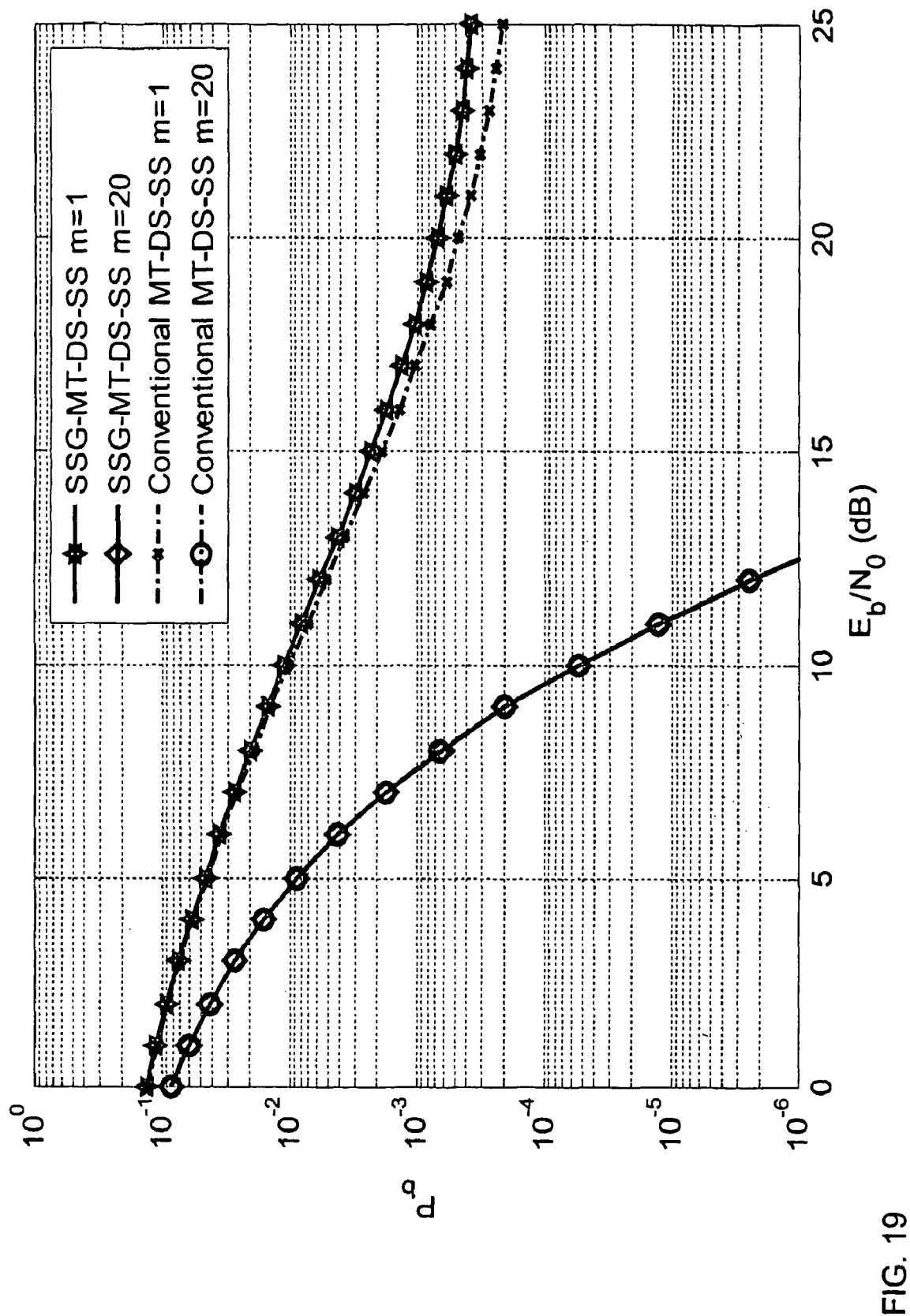
FIG. 19 is a graph of $P_b$ versus $E_b/N_0$ in dB showing an exemplary embodiment of SSG-MT-DS-SS modulation in a single user environment where $R_b$ and N are varied.
Figure 20:
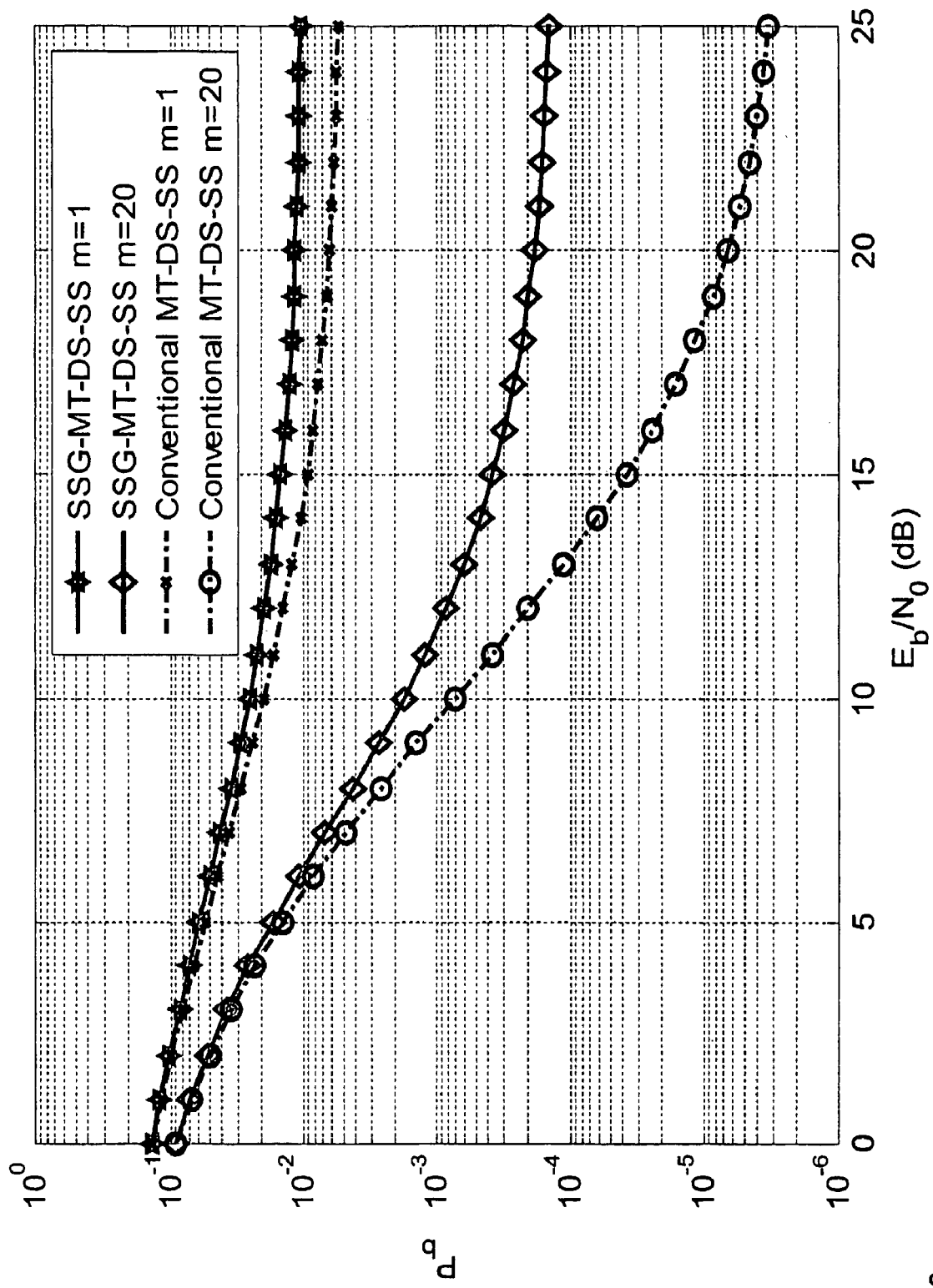
FIG. 20 is a graph of $P_b$ versus $E_b/N_0$ showing an exemplary embodiment of SSG-MT-DS-SS modulation in an environment with five users where $R_b$ and N are varied.

With reference to FIGS. 19 and 20, $P_b$ vs. $E_b/N_0$ graphs show an exemplary embodiment of SSG-MT-DS-SS modulation with M=3, $R_b=[1,2,1]$, $E_b=[1,1,1]$, $N_s=[1,¼,1]$, $\Delta f=[1,1]$ in dispersive Nakagami-m channel with 5-tap channel for each subcarrier and 4,2,4 tap-channel for each subcarrier of SSG-MT-DS-SS with decay factor of $\eta=2$ for comparison to an embodiment of MT-DS-SS modulation. The SSG-MT-DS-SS and MT-DS-SS embodiments include the same number of RAKE fingers. In FIG. 19, a graph for comparison of single user performance is provided. In FIG. 20, a graph for comparison of performance in K=5 user environment is provided.

Moreover, in FIGS. 19 and 20, the BER performance of SSG-MT-DS-SS in a dispersive channel is considered with both single and multiple users. In order to obtain the better performance, the frequency separation of SSG-MT-DS-SS is set such that each subcarrier is orthogonal to other subcarriers. In FIGS. 19 and 20, both conventional MT and SSG-MT-DS-SS may have the same number of RAKE fingers such that both systems have similar hardware complexity. From the results of FIG. 19, one can observe that SSG-MT-DS-SS has approximately the same performance as conventional MT-DS-SS in the single user case for a wide range of channel conditions. FIG. 20 shows that, in a multiuser setting, when the channel condition is severe (m=1), SSG-MT-DS-SS has BER performance comparable to that of conventional MT-DS-SS and the conventional MT-DS-SS scheme outperforms SSG-MT-DS-SS when the channel quality is good (m>1). However, the performance degradation of SSG is mainly due to the reduced processing gain on the second subcarrier. This is an example of a tradeoff for lowered spectral sidelobes and a narrower mainlobe (see FIG. 18).

In SSG-MT-DS-SS systems, the processing gain of some subcarriers may be reduced to a value below that of the conventional case in order to shape the spectrum. As a result, the ability to suppress jamming or co-channel (i.e., CDMA) interference may be reduced. To minimize this, the processing gain of these subcarriers may be kept to within a factor of four of the conventional case. Yet as indicated, spectral shaping can be attained even without losing processing gain if spectral main lobe widths are allowed to increase marginally.

In the SSG-MT-DS-SS system, the incoming bit stream is serial to parallel converted and transmitted through M subcarriers, each of which has a different data rate and processing gain to obtain spectral shaping. This is in contrast to conventional MT-DS-SS and generalized MC-DS-SS in which all subcarriers have the same parameters. The use of different bit energies on each subcarrier has been investigated, but this may result in degradation to error probability performance. In addition, the subcarrier frequency separations may be varied. This can have a significant effect upon the power spectrum and a moderate effect on the BER performance. For the processing gains, the interferences are modeled as Gaussian (e.g., greater than 30), to obtain accurate analytical performance expressions.

From analytical and simulation results, the SSG-MT-DS-SS system can have BER performance close to or equal to that obtainable with the conventional MT-DS-SS scheme, with narrower mainlobe and lower spectral sidelobes. The SSG-MT-DS-SS can have better BER performance than conventional MT-DS-SS with different spreading codes (e.g., in the AWGN channel) if a larger intersubcarrier frequency separation is employed. This naturally increases the mainlobe bandwidth, but still provides reduction of peak sidelobe levels. Orthogonality between all subcarriers can be obtained in SSG-MT-DS-SS with appropriate selection of frequency separation, but this may somewhat limit the amount of spectral shaping that can be attained. The BER performance of SSG-MT-DS-SS in fading channel is comparable to that of the unfiltered conventional MT-DS-SS system. The PAPR of SSG-MT-DS-SS is less than that of conventional MT-DS-SS. Finally, forward error correction (FEC) schemes may be used in conjunction with SSG-MT-DS-SS to maintain good performance when subcarrier energies are unequal.

Example Analysis of Correlation Integral in Equation (13)

Here "Case 2," where $R_{b,i}^{(k)}=R_{b,j}^{(u)}$ and $\mu_{i,j}^{(k,u)}>1$, is analyzed. In this case, user k's subcarrier i and user u's subcarrier j have identical bit durations, and one chip from user k's subcarrier i is interfered with by $\mu_{(i,j)}^{(k,u)}$ chips from user u's subcarrier j.

The delay, $\tau_{j,l}^{(u)}$, may be quantized as represented in the following equation (33):

$$\tau_{j,l}^{(u)}=L_i T_{c,l}^{(k)}+\epsilon_i=L_j T_{c,j}^{(u)}+\epsilon_j \quad (33)$$

where $L_i$ is an integer number given by $L_i=\lfloor \tau_{j,l}^{(u)}/T_{c,i}^{(k)} \rfloor$ and $\epsilon_i=\tau_{j,l}^{(u)}-L_i T_{c,i}^{(k)}$ is the fractional-chip part of $\tau_{j,l}^{(u)}$. Similar definitions apply for $L_j$ and $\epsilon_j$. The integral in equation (13) can be expressed as the following equation (34):

$$R_{i,j}^{(k,u)}=d_j^{(u)}(-1)R_{i,j}^{(k,u)}(\tau_{i,l}^{(u)})+d_j^{(u)}(0)\hat{R}_{i,j}^{(k,u)}(\tau_{i,l}^{(u)}) \quad (34)$$

where $R_{i,j}^{(k,u)}(\tau_{i,l}^{(u)})$ may be represented as the following equation (35):

$$R_{i,j}^{(k,u)}(\tau_{i,l}^{(u)}) = \sum_{m=0}^{L_i} c_i^{(k)}(m) c_j^{(u)}(m\mu_{i,l}^{(k,u)} - L_j - 1) \int_{mT_{c,j}^{(k)}}^{mT_{c,j}^{(k)}+\varepsilon_j} g(t)\,dt + $$

$$\sum_{m=0}^{L_i-1} c_i^{(k)}(m) \left[ \sum_{n=0}^{\mu_{i,j}^{(k,u)}-2} c_j^{(u)}(m\mu_{i,l}^{(u,k)} - L_j + n) \int_{A(m,n)}^{A(m,n)+T_{c,j}^{(u)}} g(t)\,dt + \right.$$

$$\left. c_j^{(u)}(m\mu_{i,l}^{(k,u)} + \mu_{i,l}^{(k,u)} - L_j - 1) \int_{B(m)}^{B(m)+T_{c,j}^{(u)}-\varepsilon_j} g(t)\,dt \right] +$$

$$c_i^{(k)}(L_i) \sum_{n=0}^{\lfloor \varepsilon_i/T_{c,j}^{(u)} \rfloor - 1} c_j^{(u)}(-1-n) \int_{C(n)}^{C(n)+T_{c,l}^{(u)}} g(t)\,dt$$

and $\hat{R}_{i,j}^{(k,u)}(\tau_{i,l}^{(u)})$ may be represented as the following equation (36):

$$\hat{R}_{i,j}^{(k,u)}(\tau_{i,l}^{(u)}) = c_i^{(k)}(L_i) \sum_{n=0}^{\mu_{i,j}^{(k,u)} - \lfloor \varepsilon_i/T_{c,j}^{(u)}\rfloor - 2} c_j^{(u)}(n) \int_{C(n)}^{C(n)+T_{c,j}^{(u)}} g(t)\,dt + $$

$$\sum_{m=L_i}^{N_i^{(k)}-1} c_i^{(k)}(m) c_j^{(u)}(m\mu_{i,j} + \mu_{i,j}^{(k,u)} - L_j - 1) \int_{B(m)}^{B(m)+T_{c,j}^{(u)}-\varepsilon_j} g(t)\,dt + $$

$$\sum_{m=L_i+1}^{N_i^{(k)}-1} c_i^{(k)}(m) \left[ \sum_{n=0}^{\mu_{i,j}^{(k,u)}-2} c_j^{(u)}(m\mu_{i,j}^{(k,u)} - L_j + n) \int_{A(m,n)}^{A(m,n)+T_{c,j}^{(u)}} g(t)\,dt + \right.$$

$$\left. c_j^{(u)}(m\mu_{i,j}^{(k,u)} - L_j - 1) \int_{mT_{c,j}^{(k)}}^{mT_{c,j}^{(k)}+\varepsilon_j} g(t)\,dt \right]$$

where the terms in the integration limits of equations (35) and (36) are given by $A(m,n) = mT_{c,i}^{(k)} + \varepsilon_j + (m\mu_{i,j}^{(k,u)} - L_j + n)T_{c,j}^{(u)}$, $B(m) = (m+1)T_{c,i}^{(k)} - T_{c,j}^{(u)} + \varepsilon_j$, and $C(n) = L_i T_{c,i}^{(k)} + nT_{c,j}^{(u)} + \varepsilon_j$.

Via algebraic simplification, the variance of $R_{i,j}^{(k,u)}$ for $\Delta f_{i,j}^{(k,u)} = 0$, and conditioned upon the real part of the delay $\varepsilon_j$, can be expressed as the following equation (37):

$$\text{var}[R_{i,j}^{(k,u)}] = E\left\{ \frac{N_i^{(k)}}{2} \left[ \varepsilon_j^2 + [(T_{c,j}^{(u)} - \varepsilon_j)]^2 + (\mu_{i,j}^{(k,u)} - 1)[T_{c,j}^{(u)}]^2 \right] \right\} \quad (37)$$

To find the variance of $R_{i,j}^{(k,u)}$, the expectation is taken with respect to the RV $\varepsilon_j$, which is by assumption uniformly distributed within the interval of $[0, T_{c,j}^{(u)})$. The variance of $R_{i,j}^{(k,u)}$ is may be represented by the following equation (38):

$$\text{var}[R_{i,j}^{(k,u)}] = \frac{N_i^{(k)}}{2}\left\{ \frac{2}{3} + (\mu_{i,j}^{(k,u)} - 1) \right\}[T_{c,j}^{(u)}]^2 \quad (38)$$

When $\Delta f_{i,j}^{(k,u)} \neq 0$, we find the variance of $R_{i,j}^{(k,u)}$ may be represented by the following equation (39):

$$\text{var}[R_{i,j}^{(k,u)}] = \quad (39)$$

$$\frac{N_i^{(k)}}{2(\pi\Delta f_{i,j}^{(u,k)})^2}\{1 - \text{sinc}[2\Delta f_{i,j}^{(k,u)} T_{c,j}^{(u)}] + (\mu_{i,j}^{(k,u)} - 1)\sin^2[\pi \Delta f_{i,j}^{(k,u)} T_{c,j}^{(u)}]\}$$

Example IS-SUI Statistics Derivation

For the single-user, AWGN channel case, for subcarrier i, equation (8) may be simplified to the following equation (40):

$$Z_i = D + N + \sum_{\substack{j=1 \\ j \neq i}}^{M} I_{i,j} \quad (40)$$

where the term $I_{i,j}$ is the inter-subcarrier, same-user interference (IS-SUI), and the corresponding values of $\alpha$'s for D and N following equation (8) are set equal to unity. In this example, an exemplary computation of the variance of the IS-SUI terms is shown. The nine variance computations are given above in Table 2. The IS-SUI expressions for other cases can be obtained following the method illustrated here. Note that since this analysis of IS-SUI applies to the single user case, the user superscript is ignored in equations 40-44 and the timing diagram below.

Case 9, where $\lambda_{i,j} > 1$ and $\mu_{i,j} < 1$ is analyzed herein. In this case, one symbol from the $i^{th}$ subcarrier of is interfered with by part of the symbol from its $j^{th}$ subcarrier. See the timing diagram below, where $\lambda_{i,j} = 2$, and $\mu_{i,j} = \frac{1}{2}$. Also, one chip from the $j^{th}$ subcarrier interferes with $1/\mu_{i,j}$ chips from the $i^{th}$ subcarrier.

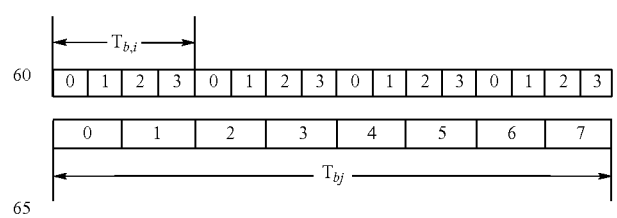

The IS-SUI term for this case may be represented by the following equation (41):

$$I_{i,j} = \sqrt{\frac{E_{b,j}}{2T_{b,j}}} \int_0^{T_{b,j}} [d_j(0)p_{T_{b,j}}(t)c_j(t)]c_i(t)\cos(\Delta\omega_{i,j}t)dt \qquad (41)$$

$$= \sqrt{\frac{E_{b,j}}{2T_{b,j}}} d_j(0) \sum_{m=0}^{N_j/\lambda_{i,j}-1} c_j(m) \sum_{n=m/\mu_{i,j}}^{(m+1)/\mu_{i,j}-1}$$

$$c_i(n) \int_{nT_{c,i}}^{(n+1)T_{c,i}} \cos(\Delta\omega_{i,j}t)dt$$

$$= \sqrt{\frac{E_{b,j}}{2T_{b,j}}} d_j(0)T_{c,i}\operatorname{sinc}(\Delta f T_{c,i}) \sum_{n=m/\mu_{i,j}}^{(m+1)/\mu_{i,j}-1}$$

$$c_i(n)\cos[\pi\Delta f(2n+1)T_{c,i}]$$

$$= \psi_{i,i}d_j(0) \sum_{m=0}^{N_j-1} c_j(m) \sum_{n=m/\mu_{i,j}}^{(m+1)/\mu_{i,j}-1} c_i(n)\cos[\pi\Delta f(2n+1)T_{c,i}]$$

where $\psi_{i,i} = T_{c,i} \operatorname{sinc}(\Delta f_{i,j}T_{c,i})\sqrt{E_{b,j}/(2T_{b,j})}$.

Since the data symbols in $\{-1,1\}$ are assumed to have zero mean, and the spreading codes on different subcarriers are unique and random, the variance of $I_{i,j}$ is its second moment, which can be evaluated as the square of the terms in the summation of equation (40). The variance of $I_{i,j}$ may be represented by the following equation (42):

$$\operatorname{var}(I_{i,j}) = \psi_{i,i}^2 \sum_{m=0}^{N_j/\lambda_{i,j}-1} \sum_{n=m/\mu_{i,j}}^{(m+1)/\mu_{i,j}-1} c_i^2(n)\cos^2[\pi\Delta f_{i,j}(2n+1)T_{c,i}] \qquad (42)$$

$$= \psi_{i,i}^2 \sum_{m=0}^{N_j} \cos^2[\pi\Delta f_{i,j}(2n+1)T_{c,i}]$$

Now using $\cos^2(x) = [\cos(2x)+1]/2$ and the identity represented by the following equation (43):

$$\sum_{m=0}^{N-1} \cos(my + x) = \frac{\cos\{x + [(N-1)/2]y\}\sin(Ny/2)}{\sin(y/2)} \qquad (43)$$

equation (42) may be reduced to the following equation (44):

$$\operatorname{var}(I_{i,j}) = \psi_{i,i}^2 \left\{ \frac{N_i}{2} + \frac{\sin[4\pi\Delta f_{i,j}T_{c,i}N_i]}{4\sin[2\pi\Delta f_{i,j}T_{c,i}]} \right\} \qquad (44)$$

as given by the final entry of Table 2. See, e.g., R. L. Peterson et al., Introduction to Spread Spectrum Communications, Prentice-Hall, Upper Saddle River, N.J., 1995 the contents of which are fully incorporated herein by reference.

Orthogonal Subcarrier Signals by Appropriate Selection of $\Delta f_{i,j}$

In the SSG-MT-DS-SS system, the intersubcarrier interference between the $i^{th}$ and $j^{th}$ subcarriers for the $0^{th}$ chip on subcarrier i can be expressed as the following equation (45):

$$\rho_{i,j} = \int_0^{T_{c,i}} c_i(0)c_j(t)\cos(2\pi f_i)\cos(2\pi f_j)dt \qquad (45)$$

$$= \begin{cases} \frac{c_i(0)c_j(0)}{2\pi\Delta f_{i,j}} \sin(2\pi\Delta f_{i,j}T_{c,i}), & T_{c,i} \leq T_{c,j} \\ \frac{c_i(0)\sin(\pi\Delta f_{i,j}T_{c,i})}{\pi\Delta f_{i,j}} \sum_{l=0}^{\mu_{i,j}-1} & T_{c,i} > T_{c,j} \\ c_j(l)\cos[\pi\Delta f_{i,j}T_{c,i}(2l+1)] \end{cases}$$

where as defined before $\mu_{i,j}$ is the chip duration ratio between the $i^{th}$ and $j^{th}$ subcarriers, i.e., $\mu_{i,j} = T_{c,i}/T_{c,j}$.

For the SSG-MT-DS-SS system, the data rates of the $i^{th}$ and $j^{th}$ subcarriers can be expressed by $R_{b,i} = \lambda_i R_{b,basic}$ and $R_{b,j} = \lambda_j R_{b,basic}$, where $R_{b,basic}$ is the lowest data rate among subcarriers in the SSG system, and $\lambda_i, \lambda_j$ are integers. Similarly, the frequency separation between subcarriers i, j by $\Delta f_{i,j} = \kappa_{i,j} R_{b,basic}$, can be expressed with an appropriate choice of $\kappa_{i,j}$.

Then, for $T_{c,i} \leq T_{c,j}$, the intersubcarrier interference on the $0^{th}$ chip of the $i^{th}$ subcarrier may be represented by the following equation (46):

$$\rho_{i,j} = \frac{c_i(0)c_j(0)}{2\pi\Delta f_{i,j}} \sin[2\pi\kappa_{i,j}/(N_i\lambda_i)], \qquad (46)$$

and the corresponding interference on the $0^{th}$ chip of the $j^{th}$ subcarrier from subcarrier i may be represented by the following equation (47):

$$\rho_{j,i} = \frac{c_i(0)\sin[\pi\kappa_{i,j}/(N_j\lambda_j)]}{\pi\Delta f_{i,j}} \sum_{l=0}^{\gamma_{i,j}-1} c_j(l)\cos[\pi\kappa_{i,j}(2l+1)/(N_j\lambda_j)] \qquad (47)$$

where $N_i$ and $N_j$ are the processing gains of the $i^{th}$ and $j^{th}$ subcarriers, respectively.

To make the $i^{th}$ subcarrier and $j^{th}$ subcarrier orthogonal to each other, (for both $\rho_{i,j}=0$ and $\rho_{j,i}=0$) $\kappa_{i,j}=\beta \operatorname{LCM}(N_i\lambda_i/2, N_j\lambda_j)$ may be chosen, where $\operatorname{LCM}(x,y)$ is the least common multiple function, and $\beta$ is a positive integer.

One example is shown in FIGS. 13 and 14. In FIGS. 13 and 14, the frequency separations are $\Delta f_{i,j}=64R_b$, the data rates are $R_b=[1,2,1]R_b$, the processing gains are $N=[128, 32, 128]$, and $\rho_{1,2}=0$ and $\rho_{2,1}=0$ are found.

While the SSG-MT-DS-SS modulation scheme has been illustrated by the description of embodiments thereof, and while the embodiments have been described in considerable detail, it is not the intention of this specification to restrict or in any way limit the scope of the appended claims to such detail. Therefore, the modulation scheme, in its broader aspects, is not limited to the specific details, the representative apparatus, and illustrative examples shown and described. Accordingly, departures may be made from such details without departing from the spirit or scope of the applicant's general concept for the modulation scheme.

The invention claimed is:

1. An apparatus for transmitting a direct sequence spread spectrum signal, including:

a data transformation process transforming an input data signal into a plurality of digital data streams based, at least in part, on a data rate vector to form a plurality of channels;

a logic circuit for each channel in communication with the data transformation process to form a plurality of analog data signals corresponding to the plurality of channels, each logic circuit spreading the digital data stream for the corresponding channel based, at least in part, on a processing gain vector defining a proportional relationship between a chip rate and the data rate vector for the corresponding channel;

a combining process for each channel in communication with the logic circuit for the corresponding channel to form a plurality of modulated subcarrier data signals corresponding to the plurality of channels, each combining process combining the analog data signal for the corresponding channel with a subcarrier frequency defined, at least in part, by a frequency separation vector associated with adjacent subcarrier frequencies; and an amplifier for each channel in communication with the combining process for the corresponding channel to form a plurality of scaled subcarrier data signals corresponding to the plurality of channels, each amplifier amplifying the modulated subcarrier data signal for the corresponding channel based, at least in part, on a bit energy vector;

wherein a value for at least one of the data rate vector, processing gain vector, frequency separation vector, and bit energy vector for at least one channel is different from another value for the corresponding data rate vector, processing gain vector, frequency separation vector, or bit energy vector for another channel, and wherein the frequency separation vector contains at least one element with a value equal to or less than an element with the minimum value in the data rate vector, thereby causing overlap among subcarrier spectra to produce spectral shaping.

2. The apparatus set forth in claim 1 wherein the data transformation process is adapted so that a first data rate vector value for a first channel is different from a second data rate vector value for a second channel in conjunction with the transforming.

3. The apparatus set forth in claim 2 wherein the data transformation process is adapted so that the data rate vector values for one or more channels can be changed in conjunction with the transforming.

4. The apparatus set forth in claim 1 wherein the logic circuit is adapted so that a first processing gain vector value for a first channel is different from a second processing gain vector value for a second channel in conjunction with the spreading.

5. The apparatus set forth in claim 4 wherein the logic circuit is adapted so that the processing gain vector values for one or more channels can be changed in conjunction with the spreading.

6. The apparatus set forth in claim 1 wherein the combining process is adapted so that a first frequency separation vector value for a first channel is different from a second frequency separation vector value for a second channel in conjunction with the combining.

7. The apparatus set forth in claim 6 wherein the combining process is adapted so that the frequency separation vector values for one or more channels can be changed in conjunction with the combining.

8. The apparatus set forth in claim 1 wherein the amplifier is adapted so that a first bit energy vector value for a first channel is different from a second bit energy vector value for a second channel in conjunction with the amplifying.

9. The apparatus set forth in claim 8 wherein the amplifier is adapted so that the bit energy vector values for one or more channels can be changed in conjunction with the amplifying.

10. A method of transmitting a direct sequence spread spectrum signal, including:
   a) transforming an input data signal into a plurality of digital data streams based, at least in part, on a data rate vector to form a plurality of channels;
   b) spreading each digital data stream based, at least in part, on a processing gain vector defining a proportional relationship between a chip rate and the corresponding data rate vector to form a plurality of analog data signals corresponding to the plurality of channels;
   c) combining each analog data signal with a subcarrier frequency defined, at least in part, by a frequency separation vector associated with adjacent subcarrier frequencies to form a plurality of modulated subcarrier data signals corresponding to the plurality of channels; and
   d) amplifying each modulated subcarrier data signal based, at least in part, on a bit energy vector to form a plurality of scaled subcarrier data signals corresponding to the plurality of channels;

wherein a value for at least one of the data rate vector, processing gain vector, frequency separation vector, and bit energy vector for at least one channel is different from another value for the corresponding data rate vector, processing gain vector, frequency separation vector, or bit energy vector for another channel, and wherein the frequency separation vector contains at least one element with a value equal to or less than an element with the minimum value in the data rate vector, thereb causing overlap among subcarrier spectra to produce spectral shaping.

11. The method set forth in claim 10 wherein the transforming in a) includes using a first data rate vector value for a first channel and a second data rate vector value for a second channel, the second data rate vector value being different from the first data rate vector value.

12. The method set forth in claim 11 wherein the transforming in a) includes changing data rate vector values for one or more channels.

13. The method set forth in claim 10 wherein the spreading in b) includes using a first processing gain vector value for a first channel and a second processing gain vector value for a second channel, the second processing gain vector value being different from the first processing gain vector value.

14. The method set forth in claim 13 wherein the spreading in b) includes changing processing gain vector values for one or more channels.

15. The method set forth in claim 10 wherein the combining in c) includes using a first frequency separation vector value for a first channel and a second frequency separation vector value for a second channel, the second frequency separation vector value being different from the first frequency separation vector value.

16. The method set forth in claim 15 wherein the combining in c) includes changing frequency separation vector values for one or more channels.

17. The method set forth in claim 10 wherein the amplifying in d) includes using a first bit energy vector value for a first channel and a second bit energy vector value for a second channel, the second bit energy vector value being different from the first bit energy vector value.

18. The method set forth in claim 17 wherein the amplifying in d) includes changing bit energy vector values for one or more channels.

19. An apparatus for receiving a direct sequence spread spectrum signal, including:
an amplifier for each of a plurality of individual subcarrier data signals, the plurality of individual subcarrier data signals corresponding to a plurality of channels, each amplifier amplifying the individual subcarrier data signal for a corresponding channel based, at least in part, on a bit energy vector to form a corresponding plurality of scaled subcarrier data signals;
a separating process for each channel in communication with the amplifier for the corresponding channel to form a plurality of analog data signals corresponding to the plurality of channels, each separating process separating a subcarrier frequency from the scaled subcarrier data signal to form the analog data signal for the corresponding channel by identifying the subcarrier frequency associated with the scaled subcarrier data signal, the subcarrier frequency defined, at least in part, by a frequency separation vector associated with adjacent subcarrier frequencies;
a logic circuit for each channel in communication with the separating process for the corresponding channel to form a plurality of digital data streams corresponding to the plurality of channels, each logic circuit despreading the analog data signal for the corresponding channel based, at least in part, on a processing gain vector defining a proportional relationship between a chip rate and a corresponding data rate vector; and
a data transformation process in communication with the logic circuits and transforming the plurality of digital data streams into an output data signal based, at least in part, on the data rate vector;
wherein a value for at least one of the data rate vector, processing gain vector, frequency separation vector, and bit energy vector for at least one channel is different from another value for the corresponding data rate vector, processing gain vector, frequency separation vector, or bit energy vector for another channel, and
wherein the frequency separation vector contains at least one element with a value equal to or less than an element with the minimum value in the data rate vector. thereby causing overlap among subcarrier spectra to produce spectral shaping.

20. The apparatus set forth in claim 19 wherein the data transformation process is adapted so that a first data rate vector value for a first channel is different from a second data rate vector value for a second channel in conjunction with the transforming.

21. The apparatus set forth in claim 19 wherein the logic circuit is adapted so that a first processing gain vector value for a first channel is different from a second processing gain vector value for a second channel in conjunction with the spreading.

22. The apparatus set forth in claim 19 wherein the separating process is adapted so that a first frequency separation vector value for a first channel is different from a second frequency separation vector value for a second channel in conjunction with the separating.

23. The apparatus set forth in claim 19 wherein the amplifier is adapted so that a first bit energy vector value for a first channel is different from a second bit energy vector value for a second channel in conjunction with the amplifying.

24. A method of receiving a direct sequence spread spectrum signal, including:
a) amplifying each of a plurality of individual subcarrier data signals, based, at least in part, on a bit energy vector to form a corresponding plurality of scaled subcarrier data signals, the plurality of individual subcarrier data signals corresponding to a plurality of channels;
b) separating an analog data signal from each scaled subcarrier data signal to form a plurality of analog data signals by identifying a subcarrier frequency associated with the corresponding scaled subcarrier data signal, the subcarrier frequency defined, at least in part, by a frequency separation vector associated with adjacent subcarrier frequencies, the plurality of analog data signals corresponding to the plurality of channels;
c) despreading each analog data signal to form a plurality of digital data streams, the despreading based, at least in part, on a processing gain vector defining a proportional relationship between a chip rate and a corresponding data rate vector, the plurality of digital data streams corresponding to the plurality of channels; and
d) transforming the plurality of digital data streams into an output data signal based, at least in part, on a data rate vector;
wherein a value for at least one of the data rate vector, processing gain vector, frequency separation vector, and bit energy vector for at least one channel is different from another value for the corresponding data rate vector, processing gain vector, frequency separation vector, or bit energy vector for another channel, and
wherein the frequency separation vector contains at least one element with a value equal to or less than an element with the minimum value in the data rate vector, thereby causing overlap among subcarrier spectra to produce spectral shaping.

25. The method set forth in claim 24 wherein the transforming in d) includes using a first data rate vector value for a first channel and a second data rate vector value for a second channel, the second data rate vector value being different from the first data rate vector value.

26. The method set forth in claim 24 wherein the despreading in c) includes using a first processing gain vector value for a first channel and a second processing gain vector value for a second channel, the second processing gain vector value being different from the first processing gain vector value.

27. The method set forth in claim 24 wherein the separating in b) includes using a first frequency separation vector value for a first channel and a second frequency separation vector value for a second channel, the second frequency separation vector value being different from the first frequency separation vector value.

28. The method set forth in claim 24 wherein the amplifying in a) includes using a first bit energy vector value for a first channel and a second bit energy vector value for a second channel, the second bit energy vector value being different from the first bit energy vector value.

29. A system for communicating a direct sequence spread spectrum signal, including:
a transmitter transmitting the direct sequence spread spectrum signal, the transmitter including:
a first data transformation process transforming an input data signal into a first plurality of digital data streams based, at least in part, on a data rate vector to form a plurality of first channels;
a first logic circuit for each first channel in communication with the first data transformation process to form a plurality of first analog data signals corresponding to the plurality of first channels, each first logic circuit spreading the first digital data stream for the corresponding first channel based, at least in part, on a processing gain vector defining a proportional relationship between a chip rate and the data rate vector for the corresponding first channel;

a combining process for each first channel in communication with the first logic circuit for the corresponding first channel to form a plurality of modulated subcarrier data signals corresponding to the plurality of first channels, each combining process combining the first analog data signal for the corresponding first channel with a subcarrier frequency defined, at least in part, by a frequency separation vector associated with adjacent subcarrier frequencies; and a first amplifier for each first channel in communication with the combining process for the corresponding first channel to form a plurality of first scaled subcarrier data signals corresponding to the plurality of first channels, each first amplifier amplifying the modulated subcarrier data signal for the corresponding first channel based, at least in part, on a bit energy vector; and a receiver receiving the direct sequence spread spectrum signal from the transmitter, the receiver including:

a second amplifier for each of a plurality of individual subcarrier data signals, the plurality of individual subcarrier data signals corresponding to a plurality of second channels, each second amplifier amplifying the individual subcarrier data signal for a corresponding second channel based, at least in part, on the bit energy vector to form a corresponding plurality of second scaled subcarrier data signals;

a separating process for each second channel in communication with the second amplifier for the corresponding second channel to form a plurality of second analog data signals corresponding to the plurality of second channels, each separating process separating a second analog data signal from the second scaled subcarrier data signal for the corresponding second channel by identifying the subcarrier frequency associated with the modulated subcarrier data signal, the subcarrier frequency defined, at least in part, by the frequency separation vector associated with adjacent subcarrier frequencies;

a second logic circuit for each second channel in communication with the separating process for the corresponding second channel to form a plurality of second digital data streams corresponding to the plurality of second channels, each second logic circuit despreading the second analog data signal for the corresponding second channel based, at least in part, on the processing gain vector; and a second data transformation process in communication with the second logic circuits and transforming the plurality of second digital data streams into an output data signal based, at least in part, on the data rate vector;

wherein a value for at least one of the data rate vector, processing gain vector, frequency separation vector, and bit energy vector for at least one first channel and corresponding second channel is different from another value for the corresponding data rate vector, processing gain vector, frequency separation vector, or bit energy vector for another first channel and corresponding second channel, and wherein the frequency separation vector contains at least one element with a value equal to or less than an element with the minimum value in the data rate vector, thereby causing overlap among subcarrier spectra to produce spectral shaping.

30. A method of communicating a direct sequence spread spectrum signal from a first apparatus to a second apparatus, including:

a) at the first apparatus, transforming an input data signal into a plurality of digital data streams based, at least in part, on a data rate vector to form a plurality of channels;

b) at the first apparatus, spreading each digital data stream based, at least in part, on a processing gain vector defining a proportional relationship between a chip rate and the corresponding data rate vector to form a plurality of analog data signals corresponding to the plurality of channels;

c) at the first apparatus, combining each analog data signal with a subcarrier frequency defined, at least in part, by a frequency separation vector associated with adjacent subcarrier frequencies to form a plurality of modulated subcarrier data signals corresponding to the plurality of channels;

d) at the first apparatus, amplifying each modulated subcarrier data signal based, at least in part, on a bit energy vector to form a plurality of scaled subcarrier data signals corresponding to the plurality of channels;

e) at the second apparatus, amplifying each of a plurality of individual subcarrier data signals, based, at least in part, on the bit energy vector associated with the amplifying in d) to form a corresponding plurality of scaled subcarrier data signals, the plurality of individual subcarrier data signals corresponding to a plurality of channels;

f) at the second apparatus, separating an analog data signal from each scaled subcarrier data signal to form a plurality of analog data signals by identifying a subcarrier frequency associated with the corresponding scaled subcarrier data signal, the subcarrier frequency defined, at least in part, by the frequency separation vector associated with the combining in c), the plurality of analog data signals corresponding to the plurality of channels;

g) at the second apparatus, despreading each analog data signal to form a plurality of digital data streams, the despreading based, at least in part, on the processing gain vector associated with the spreading in b), the plurality of digital data streams corresponding to the plurality of channels; and h) at the second apparatus, transforming the plurality of digital data streams into an output data signal based, at least in part, on the data rate vector associated with the transforming in a);

wherein a value for at least one of the data rate vector, processing gain vector, frequency separation vector, and bit energy vector for at least one channel is different from another value for the data rate vector, processing gain vector, frequency separation vector, or bit energy vector for another channel, and wherein the frequency separation vector contains at least one element with a value equal to or less than an element with the minimum value in the data rate vector, thereby causing overlap among subcarrier spectra to roduce spectral shaping.

* * * * *